US008861054B2

(12) United States Patent
Iwayama et al.

(10) Patent No.: US 8,861,054 B2
(45) Date of Patent: Oct. 14, 2014

(54) IMAGE PROCESSING APPARATUS, IMAGE PROCESSING METHOD, COMPUTER READABLE MEDIUM AND IMAGE PROCESSING SYSTEM

(75) Inventors: Akira Iwayama, Kahoku (JP); Toshihide Suzumura, Kahoku (JP)

(73) Assignee: PFU Limited, Kahoku-shi (JP)

( * ) Notice: Subject to any disclaimer, the term of this patent is extended or adjusted under 35 U.S.C. 154(b) by 127 days.

(21) Appl. No.: 13/543,286

(22) Filed: Jul. 6, 2012

(65) Prior Publication Data
US 2013/0063788 A1 Mar. 14, 2013

(30) Foreign Application Priority Data
Sep. 8, 2011 (JP) ................................. 2011-196458

(51) Int. Cl.
H04N 1/46 (2006.01)
G06K 9/48 (2006.01)
G06K 9/36 (2006.01)
G06K 9/32 (2006.01)
G06K 9/00 (2006.01)

(52) U.S. Cl.
CPC .......... *G06K 9/00442* (2013.01); *G06K 9/3275* (2013.01); *G06K 9/3233* (2013.01)
USPC ............ 358/538; 382/197; 382/199; 382/291

(58) Field of Classification Search
USPC ............................ 358/538; 382/197, 199, 291
See application file for complete search history.

(56) References Cited

U.S. PATENT DOCUMENTS

| 5,491,759 A * | 2/1996 | Nagao et al. ................. 382/199 |
| 7,102,786 B2 | 9/2006 | Takahashi et al. |
| 2009/0231639 A1 | 9/2009 | Iwayama |
| 2010/0284043 A1 | 11/2010 | Hattori |

FOREIGN PATENT DOCUMENTS

| CN | 101344924 (B) | 7/2012 |
| JP | 10-224563 | 8/1998 |
| JP | 2002-252747 | 9/2002 |
| JP | 2009-218953 | 9/2009 |
| JP | 2010-263434 | 11/2010 |

OTHER PUBLICATIONS

Office action issued on Aug. 18, 2014 in corresponding Chinese Application No. 201210325822.8, including English translation, 16pp.

* cited by examiner

*Primary Examiner* — Charlotte M Baker
(74) *Attorney, Agent, or Firm* — Christie, Parker & Hale, LLP

(57) ABSTRACT

Provided are an image processing apparatus, an image processing method, a computer-readable medium storing a computer program and an image processing system improving edge detection precision at the time of flare occurrence. The image processing apparatus includes an input unit for taking image data including a document region, a first candidate detector for detecting a first candidate of an edge point constituting a boundary line of the document region by scanning binarized image of the image data with a predetermined pattern along a line, a second candidate detector for detecting a second candidate of an edge point based on differential value of pixels adjoining each other, and an edge point determination unit for determining the second candidate as an edge point when the second candidate is positioned more inside of the document region than the first candidate, and otherwise determines the first candidate as an edge point.

10 Claims, 21 Drawing Sheets

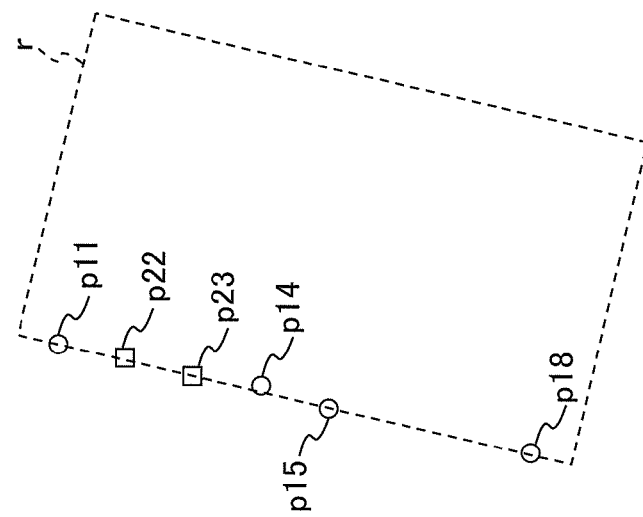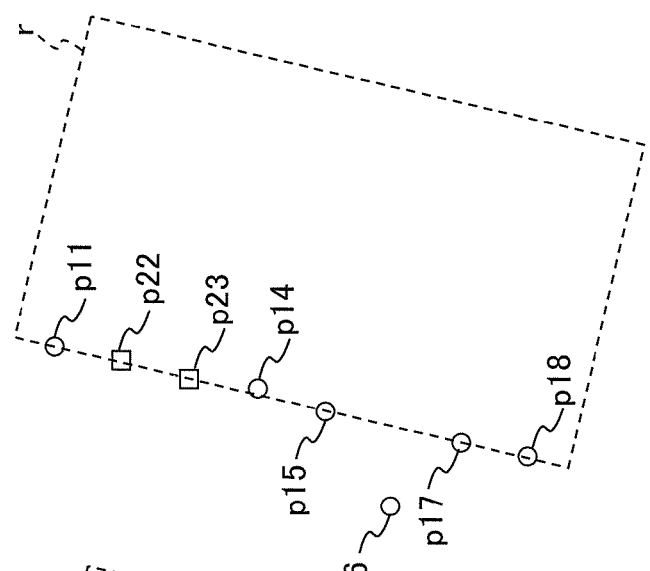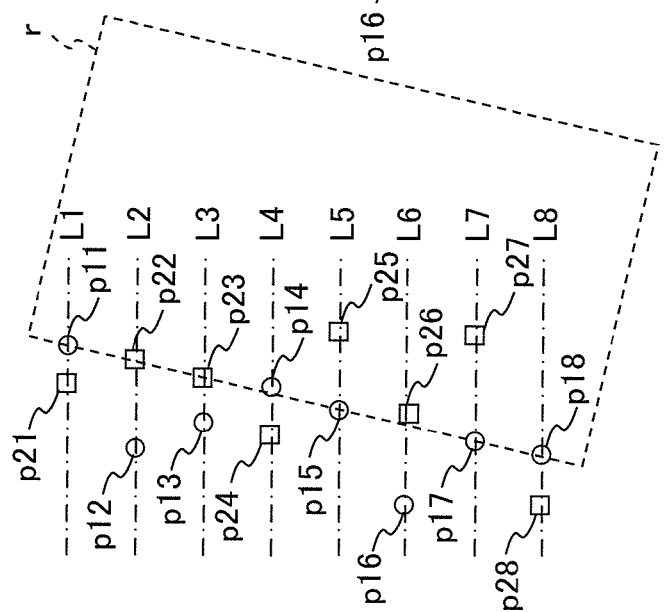

| 1 | 1 | 1 | 1 | 0 | 0 | 0 | 0 |

| 0 | 0 | 0 | 0 | 1 | 1 | 1 | 1 |

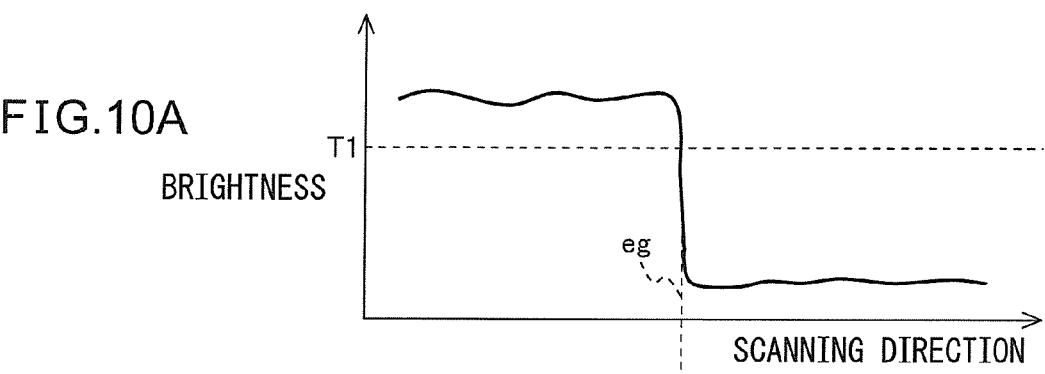
FIG.10A BRIGHTNESS
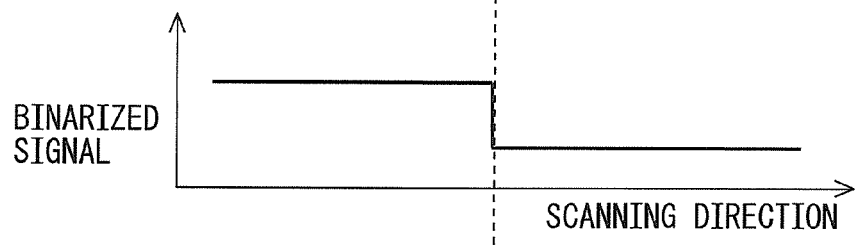
FIG.10B BINARIZED SIGNAL
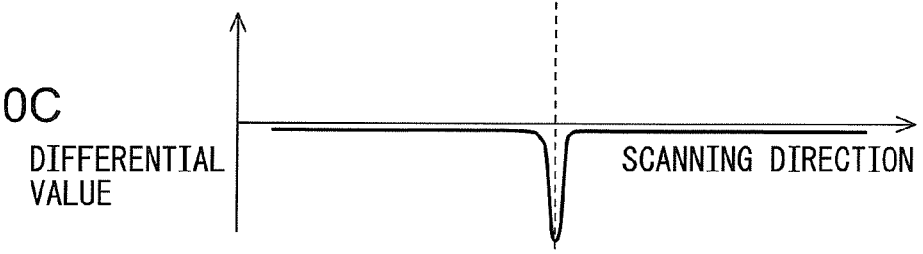
FIG.10C DIFFERENTIAL VALUE
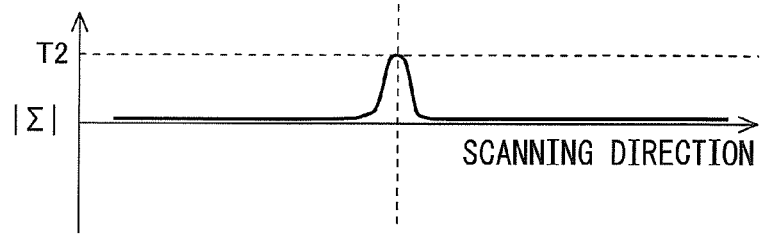
FIG.10D |Σ| ized as an edge.

IMAGE PROCESSING APPARATUS, IMAGE PROCESSING METHOD, COMPUTER READABLE MEDIUM AND IMAGE PROCESSING SYSTEM

CROSS-REFERENCE TO RELATED APPLICATIONS

This application is based upon and claims the benefit of priority of prior Japanese Patent Application No. 2011-196458, filed on Sep. 8, 2011, the entire contents of which are incorporated herein by reference.

TECHNICAL FIELD

Embodiments described in the present specification relate to image processing.

BACKGROUND

An image processing apparatus has been known which acquires image data by reading a document and detects a document region from the image data. For example, the image processing apparatus acquires an image containing a document region, detects coordinate values of edge candidate pixels based on the obtained image, calculates the tilting of the document region based on the detected coordinate values of the edge candidate pixels, and extracts coordinate values of edge end candidate pixels based on the detected coordinate values of the edge candidate pixels. Then, the image processing apparatus calculates a straight line corresponding to an edge based on the calculated tilting of the document region and the extracted coordinate values of edge end candidate pixels, and corrects the tilting of the document region on the basis of the calculated straight line corresponding to the edge, and crops the document region from the image based on the relevant straight line.

As another example, an image processing apparatus has been known which, in extracting a document region, compares a differential value with a threshold value of a pixel in order to determine whether or not the pixel is to be read out.

Also, an image reader which processes image data outputted from an image sensor has been known. The image reader includes a document region detection unit that detects pixels having density variation larger than a threshold as candidate points to be estimated as document end points, a document region correction unit that recognizes document end points indicating positions of document ends based on the position of the candidate points. The document region detection unit includes a density variation calculating unit that calculates density variation of the focused pixel based on image density of surrounding pixels, and a determination unit that detects the focused pixel as a candidate point when density of a prescribed number of consecutive pixels that continue either in scanning direction or in reverse scanning direction from the focused pixel after binarization at a prescribed slice level is same for each pixel. For a focused pixel for which density variation is less than a threshold and not less than a second threshold, the determination unit detects the focused pixel as a provisional candidate point when density of a prescribed number of consecutive pixels that continue either in scanning direction or reverse scanning direction from the focused pixel after binarization at a prescribed slice level is the same for each pixel.

Also, a document size detection apparatus that detects an edge of a document has been known. The document size detection apparatus includes a first document edge detection unit having a first calculation unit that calculates respective differences between a focused pixel and a plurality of pixels beginning from a pixel situated at a prescribed number of pixels before the focused pixel and continuing at an equal interval, a first comparison unit that compares each of the differences obtained by the first calculation unit with a threshold and detects a case where all the differences exceed the threshold, and a first document edge detection unit that, when, as a result of the comparison of the first comparison unit, all the differences exceed the threshold, detects the position of the focused pixel as a provisional edge, and when this state is repeated for a prescribed number of times, detects the position of the provisional edge as the document edge, a second document edge detection unit having a second calculation unit that calculates the difference between the focused pixel and the previous pixel, a second comparison unit that detects a case where the difference calculated by the second calculation unit exceeds a threshold, and a second document edge detection unit which, when threshold is exceeded in the range from the focused pixel to the prescribed number of pixels before the focused pixel for number of times not less than a prescribed number, detects the position of the focused pixel as a document edge, and when this operation is performed in main scanning direction, detects the final position renewed as the document edge position as the document edge, and a size determination unit that performs size detection by detecting the larger one of the document edge positions detected by the first and the second document edge detection units as the document edge.

Related art is disclosed in Japanese Laid-open Patent Publications No. 2009-218953, 2010-263434, 2002-252747 and 10-224563.

SUMMARY

When a document region is detected from the image data obtained by reading a document with an image reader, an edge that forms a boundary line between the document region and the background region other than the document region can be detected by detecting the brightness change that is produced in the boundary line between the document region and the background region.

When difference between the brightness of the document and the brightness of the background unit provided in the image reader is large, a flare may be produced around an edge in the image data obtained by reading the document. Flare is a phenomenon in which when the read-out image has a portion of large brightness difference, brightness of a dark portion or bright portion is not constant, and brightness of the bright portion gradually decreases in accordance with the distance from the dark portion, or brightness of the dark portion gradually increases in accordance with the distance from the bright portion. Flare is produced because not only the reflected light from the portion read by the image sensor but reflected light from another portion (stray light) is also incident upon the image sensor. When flare is produced, the boundary line between the document region and the background region is blurred so that, when a flare occurs, a position outside of the proper edge may be incorrectly detected as an edge.

Incorrect detection of an edge may be produced by phenomena other than flare. An example of such phenomena is vertical line noise. Vertical line noise is a noise in the form of vertical lines extending in the secondary scanning direction of the document obtained by an image reader. Vertical line noise may occur, for example, in a scanner equipped with ADF (automatic document feeder) due to contamination of a reading unit or a background unit. Therefore, in order to improve edge detection precision at the time of flare occurrence, it is desirable that factors other than flare have small effect on edge determination.

It is an object of the disclosed apparatus and method to improve edge detection precision at the time of flare occurrence.

According to an aspect of the embodiment, an image processing apparatus is provided. The image processing apparatus includes an input unit for taking image data including a document region as input, a first candidate detector for detecting a first candidate of an edge point constituting a boundary line of the document region by scanning binarized image of the image data with a predetermined detection pattern along a line parallel to a prescribed direction of the image data, a second candidate detector for detecting a second candidate of an edge point based on differential value of pixels adjoining each other along the lines, and an edge point determination unit for determining the second candidate as an edge point when the second candidate is positioned more inside of the document region than the first candidate, and otherwise determining the first candidate as an edge point.

According to another aspect of the embodiment, an image processing system having an image reading device and a computer that receives via communication with the image reading device an image read by the image reading device is provided. The image processing system includes a first candidate detector for detecting first candidates of an edge point constituting a boundary line of a document region included in image data read by the image reading device by scanning binarized image of the image data with a predetermined detection pattern along a line parallel to a prescribed direction of the image data, a second candidate detector for detecting a second candidate of an edge point based on differential value of pixels adjoining each other along the lines, and an edge point determination unit for determining the second candidate as an edge point when the second candidate is positioned more inside of the document region than the first candidate, and otherwise determines the first candidate as an edge point.

According to another aspect of the embodiment, an image processing method is provided. The image processing method includes acquiring image data including a document region, detecting, using a computer, a first candidate of an edge point constituting a boundary line of the document region by scanning a binarized image of the image data with a predetermined detection pattern along a line parallel to a prescribed direction of image data, detecting a second candidate of an edge point based on differential value of pixels adjoining each other along the lines, and determining the second candidate as the edge point when the second candidate is positioned more inside of the document region than the first candidate, and otherwise determining the first candidate as the edge point.

According to another aspect of the embodiment, a computer-readable, non-transitory medium storing a computer program for image processing is provided. The computer program causes a computer to execute a process, the process includes acquiring image data including a document region, detecting a first candidate of an edge point constituting a boundary line of the document region by scanning a binarized image of the image data with a predetermined detection pattern along a line parallel to a prescribed direction of image data, detecting a second candidate of an edge point based on differential value of pixels adjoining each other along the lines, and determining the second candidate as the edge point when the second candidate is positioned more inside of the document region than the first candidate, and otherwise determining the first candidate as the edge point.

According to the apparatus and method disclosed herein, it is possible to improve edge detection precision at the time of flare occurrence.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 7A is a diagram illustrating an exemplary detection of a first candidate and a second candidate.

FIG. 7B is a diagram illustrating a result of edge point determination in an edge point determination processing.

FIG. 7C is a diagram illustrating a result of noise elimination in a noise elimination processing.

FIG. 10A is a diagram illustrating brightness change for a pixel at an edge.

FIG. 10B is a diagram illustrating binary signal for a pixel at an edge.

FIG. 10C is a diagram illustrating differential value for a pixel at an edge.

FIG. 10D is a diagram illustrating summation of differential value for a pixel at an edge.

DESCRIPTION OF EMBODIMENTS

1. Hardware Construction

Figure 1:
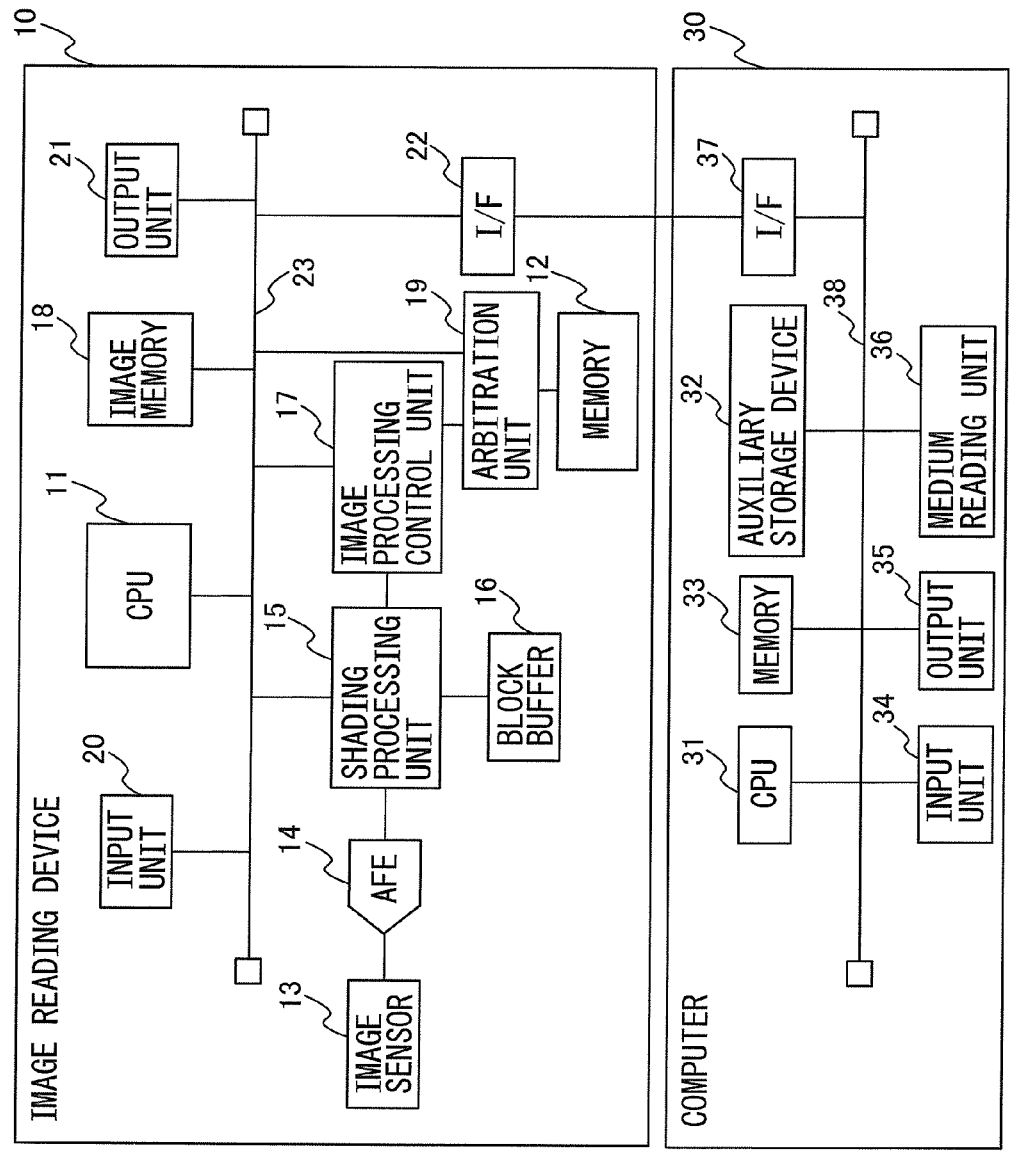
FIG. 1 is a diagram illustrating the hardware construction of an image processing system.

The embodiments will be described with reference to appended drawings that illustrate embodiments thereof. FIG. 1 is a diagram illustrating the hardware construction of an image processing system. The image processing system 1 includes an image reading device 10 and a computer 30. The image reading device 10 reads a two-dimensional document and generates an image signal corresponding to the document. The image reading device 10 may be, for example, an image reader that reads by scanning a two-dimensional document irradiated with plural light sources. Examples of such image reader include, for example, various scanners including a feeder scanner, a flat bed scanner, a handy scanner, and the like.

The computer 30 can communicate with the image reading device 10 via a wired or wireless communication line, and receives image signal of the document read by the image reading device 10 via the communication line from the image reading device 10.

The image reading device 10 includes a CPU (Central Processing Unit) 11, a memory 12, an image sensor 13, an AFE (Analog Front-End Processor) 14, a shading processing unit 15, and a block buffer 16. The image reading device 10 also includes an image processing control unit 17, an image memory 18, an arbitration unit 19, an input unit 20, an output unit 21, an interface (I/F) 22 and a bus 23.

CPU 11 controls the operation of the image reading device 10 in accordance with the computer program stored in the memory 12. CPU 11 may perform image processing of the document image read by the image reading device 10. The memory 12 may also store a computer program for such image processing. The memory 12 stores computer program executed by CPU 11, and data used in the execution of the computer program. The memory 12 may include a non-volatile storage device for storing the program and a volatile memory for temporarily storing data.

The image sensor 13 captures an image of two-dimensional document, and outputs image signal corresponding to the document. The image sensor 13 includes imaging device such as CCD (Charge Coupled Device) sensor, CMOS (Complementary Metal Oxide Semiconductor) sensor, etc., arranged in one-dimensional or two-dimensional array, and an optical system forming an image of the document on the imaging device. AFE 14 performs signal processing on the image signal outputted from the image sensor 13, and then inputs the processed signal to the shading processing unit 15.

The shading processing unit 15 stores the image signal received from AFE 14 as image data in the block buffer 16, performs shading processing on the image data, and then outputs the processed image data to the image processing control unit 17. The image processing control unit 17 performs prescribed image processing on the image data after shading processing, and stores the image data in the image memory 18. In another embodiment, the shading processing unit 15 may store the image data after shading processing in the image memory 18, and the image processing control unit 17 may take the image data from the image memory 18. The arbitration unit 19 arbitrates access to the memory 12 by the image processing control unit 17 in image processing and access to the memory 12 by CPU 11 so as not to compete with each other.

In an embodiment, the shading processing unit 15, the image processing control unit 17, and the arbitration unit 19 may be mounted to the image reading device 10 as a logic circuit. Logic circuit may be, for example, LSI (Large Scale Integration), ASIC (Application Specific Integrated Circuit), FPGA (Field Programming Gate Array), or the like. In another embodiment, the shading processing unit 15, the image processing control unit 17, and the arbitration unit 19 may be mounted to the image reading device 10 as an electronic circuit including a processor such as CPU, DSP (Digital Signal Processor), or the like, and a memory storing the program to be executed by the processor.

The input unit 20 is an inputting device that receives input operation from a user. The input unit 20 may be, for example, a button, a scroll wheel, a key pad, a keyboard, a pointing device, a touch panel, or the like. The output unit 21 is an outputting device for presenting a variety of information from the image reading device 10 to a user. The output unit 21 may be, for example, a display device for visually displaying information to be presented to a user. The output unit 21 may be a display device such as a light emitting device, a liquid crystal display, an organic electro-luminescence display, or the like. Or, the output unit 21 may be a speaker and its drive circuit for outputting audio signal.

I/F 22 is a wired or wireless communication interface between the image reading device 10 and the computer 30. The image reading device 10 can transmit the image data of the document read via I/F 22 to the computer 30. The image reading device 10 receives setting information and instruction on the operation of the image reading device 10 from the computer 30 via I/F 22. In an embodiment, the image reading device 10 may receive image data subjected to processing by the computer 30 via I/F 22. CPU 11, the shading processing unit 15, the image processing control unit 17, the arbitration unit 19, the input unit 20, the output unit 21 and I/F 22 are electrically connected by the bus 23.

On the other hand, the computer 30 includes CPU 31, an auxiliary storage device 32, a memory 33, an input unit 34, an output unit 35, a medium reading unit 36, I/F 37 and the bus 38. CPU 31 carries out information processing in accordance with a computer program stored in the auxiliary storage device 32 by executing this computer program. In an embodiment, CPU 31 may perform image processing of the document image read by the image reading device 10. A computer program for such image processing may be stored in the auxiliary storage device 32. The auxiliary storage device 32 may include a non-volatile memory, a ROM (Read Only Memory), a hard disc, and the like.

The memory 33 stores the program being executed by CPU 31, and data used temporarily by this program. The memory 33 may include RAM (Random Access Memory). The input unit 34 is an input device that receives inputting operation by a user. The input unit 34 may be, for example, a key pad, a keyboard, a pointing device, a touch panel, or the like.

The output unit 35 is an outputting device that outputs signal processed by the computer 30. For example, the output unit 35 may be a display device for displaying information processed by the computer 30 visually to a user. The output unit 35 may be a display device, for example, a liquid crystal display, CRT (Cathode Ray Tube) display, an organic electroluminescence display, or the like. Alternatively, the output unit 35 may be a speaker and its drive circuit outputting audio signal.

The medium reading unit 36 is an inputting device for reading data stored in a computer-readable portable recording medium. The medium reading unit 36 may be, for example, an access device to a CD ROM (Compact Disk Read Only Memory) drive, a DVD ROM (Digital Versatile Disk Read Only Memory) drive, a flexible disc drive, a CD-R (Compact Disc Recordable) drive or a DVD-R (Digital Versatile Disk Recordable) drive, a MO (Magneto-Optical disk) drive, a flash memory drive, and the like.

I/F 37 is a wired or wireless communication interface between the image reading device 10 and the computer 30. The computer 30 can receive the image data of document read by the image reading device 10 via I/F 37. The computer 30 transmits setting information and instructions on the operation of the image reading device 10 via I/F 37 to the image reading device 10. CPU 31, the auxiliary storage device 32, the memory 33, the input unit 34, the output unit 35, the medium reading device 36, and I/F 37 are electrically connected via the bus 38.

2. First Embodiment

2.1. Overview

Figure 2A:
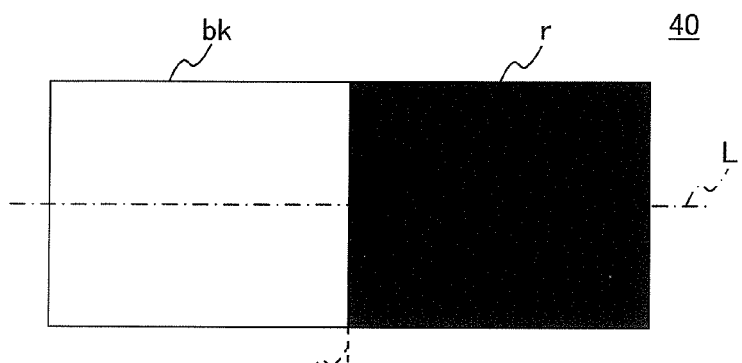
FIG. 2A is a schematic diagram illustrating an image of edge portion of a document.

An example of processing performed by the image processing system 1 will be described with reference to FIGS. 2A and 2B to FIG. 15. Image data from which an edge between the document region and the background region is detected will be described below. FIG. 2A is a schematic diagram illustrating an image of an edge portion of a document. Image data 40 include a document region r and a background region bk. The document region r is a region which is occupied by the document image read by the image sensor 13 of the image reading device 10, and the background region bk is a region other than the document region r in the image data 40.

Reference symbol eg denotes the position of an edge between the document region r and the background region bk. As illustrated, difference of brightness between the document region r and the background region bk in the image data 40 is large, and the document region r and the background region bk respectively form dark portion and bright portion of the image data 40. This applies also to the image of edge portion of the document depicted in FIG. 4A and FIG. 5A.

Figure 2B:
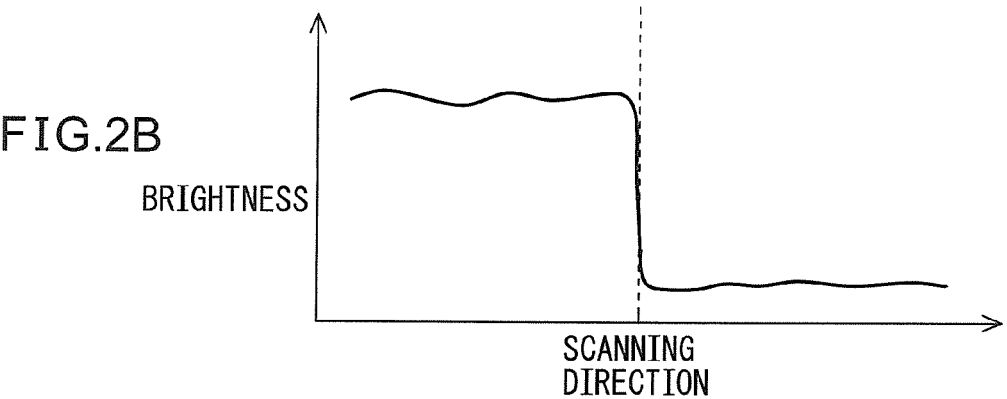
FIG. 2B is a diagram illustrating brightness change of pixels.

FIG. 2B is a diagram illustrating brightness change of the pixel in the pixel line L depicted in FIG. 2A. In the example illustrated in FIG. 2A, flare does not occur in the edge eg, and the brightness is nearly constant in the document region r and the background region bk around the edge eg, respectively, and at the position of the edge eg, apparent brightness change is produced between the document region r and the background region bk. In the description that follows, the pixel line may be referred to simply as "line".

Figure 3:
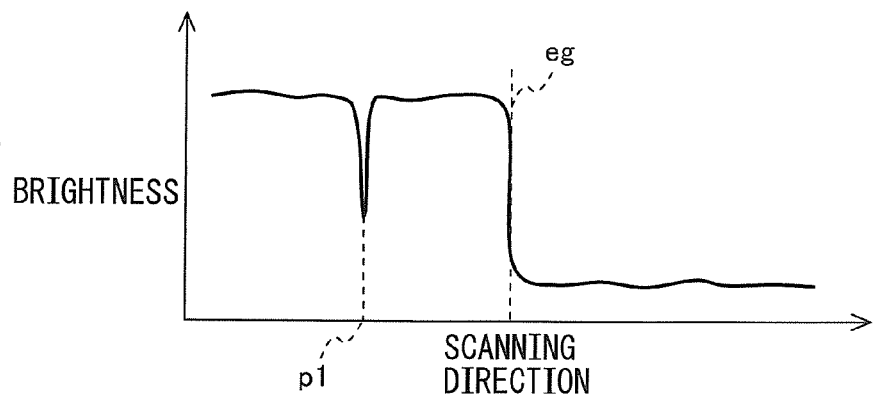
FIG. 3 is a diagram illustrating brightness change of pixels at the time of slight noise occurrence.

FIG. 3 is a diagram illustrating the brightness change of pixels at the time of slight noise occurrence. The example illustrated in FIG. 3 depicts the case where the image data 40 as illustrated in FIG. 2A includes slight noise in the background region bk. Due to existence of the slight noise, the brightness difference between the pixel at position p1 of the line L and surrounding pixels is reduced.

Figure 4A:
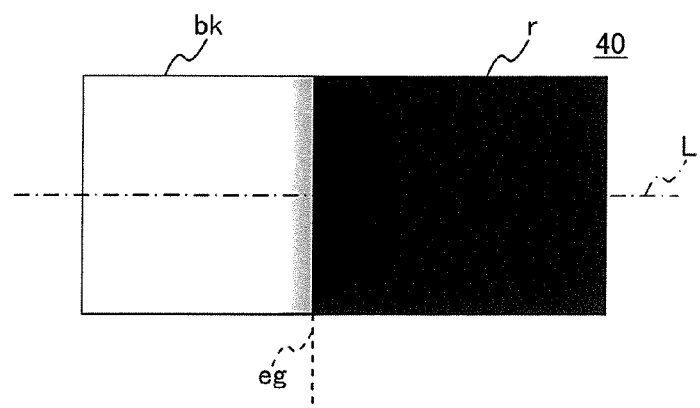
FIG. 4A is a schematic diagram illustrating an image of edge portion at the time of flare occurrence.
Figure 4B:
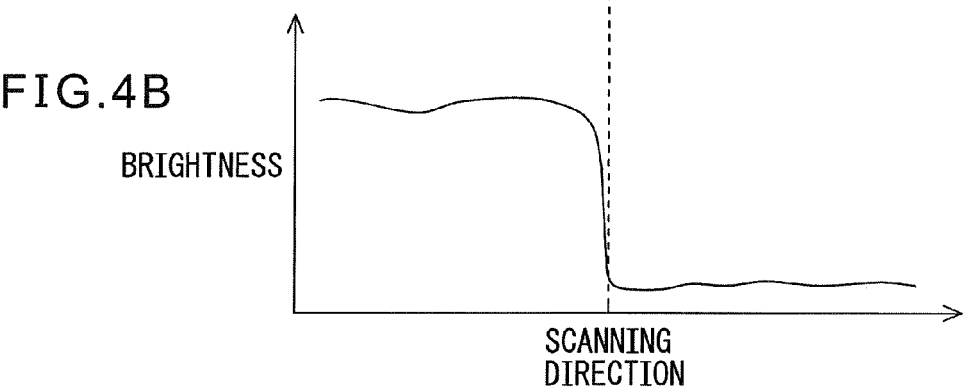
FIG. 4B is a diagram illustrating brightness change of pixels at the time of flare occurrence.

FIG. 4A is a schematic diagram illustrating the image at the edge portion at the time of flare occurrence. Due to occurrence of flare, the boundary line between the document region r and the background region bk is blurred. FIG. 4B is a diagram illustrating the brightness change of pixels on the line L of FIG. 4A. Since the boundary line between the document region r and the background region bk is blurred, the brightness gradually decreases as position changes from the background region bk to the document region r around the position of the edge eg, so that the brightness change at the position of the edge eg becomes smaller.

Figure 5A:
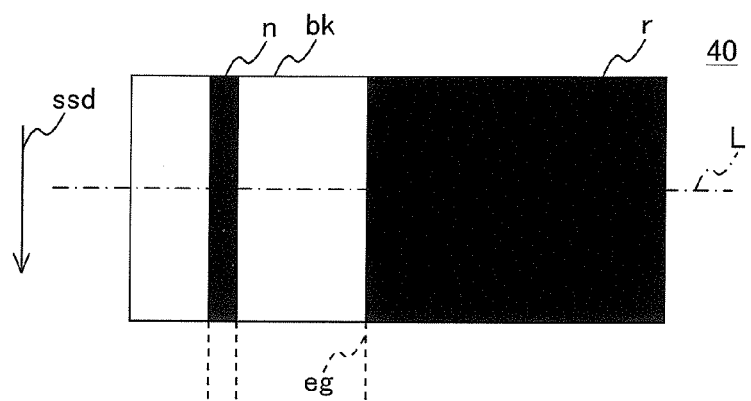
FIG. 5A is a schematic diagram illustrating an image at the time of vertical line noise occurrence.
Figure 5B:
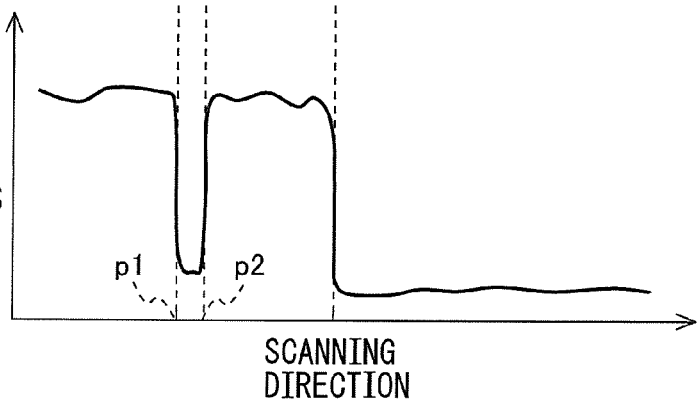
FIG. 5B is a diagram illustrating brightness change of pixels at the time of vertical line noise occurrence.

FIG. 5A is a schematic diagram illustrating the image at the edge portion at the time of occurrence of vertical line noise. The image data 40 include vertical line noise n in the background region bk. FIG. 5B is a diagram illustrating the brightness change of pixels on the line L of FIG. 5A. Vertical line noise n has certain width and occupies the range between the pixels p1 and p2 on the line L. Since the brightness difference between the portion of vertical line noise n and the portion outside of it is large, the vertical line noise n that occurs in the background region bk may be incorrectly detected as an edge.

<2.1.1. Overall Processing>

Figure 6:
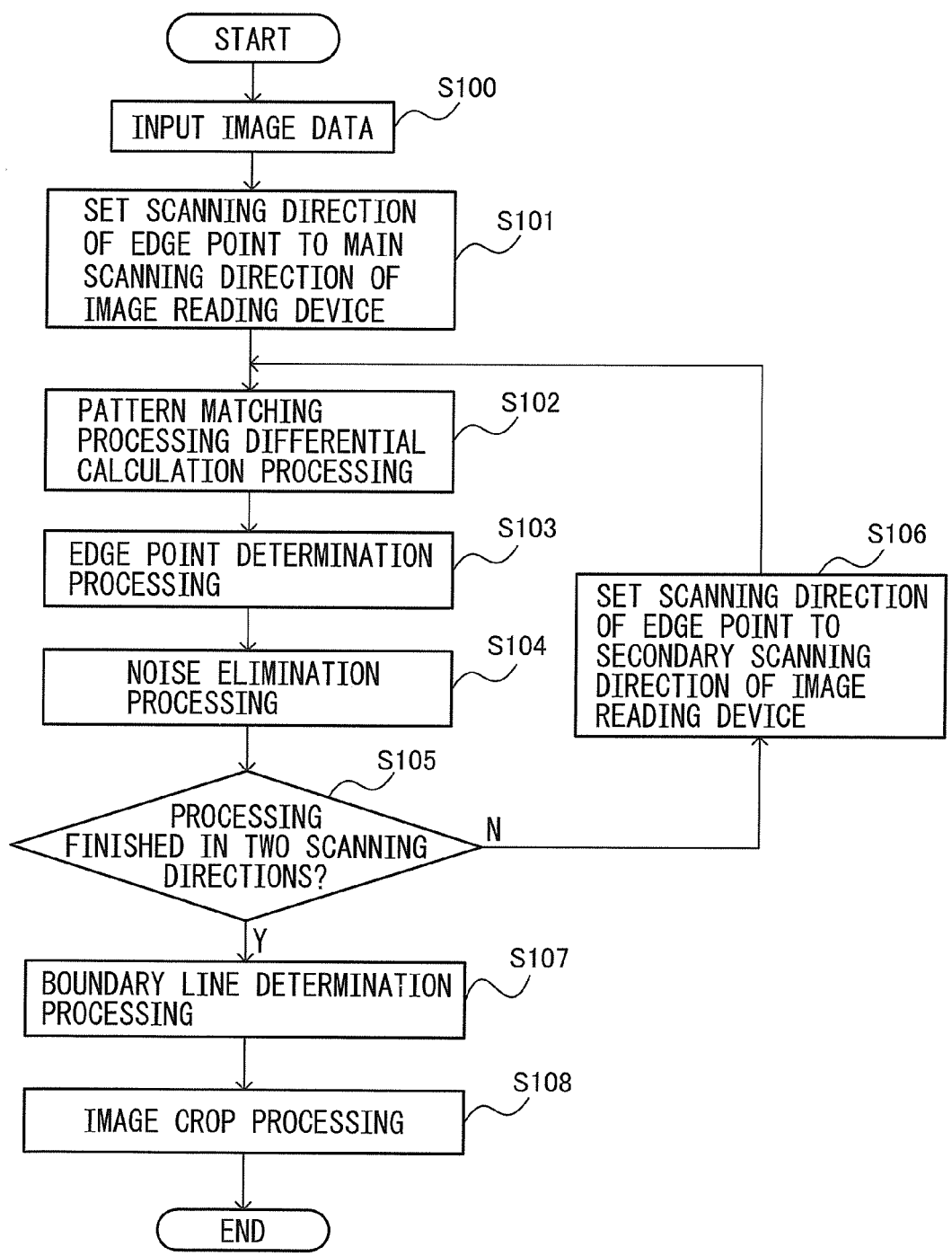
FIG. 6 is a diagram illustrating an example of processing performed by an image processing system.

Next, an example of overall processing by the image processing system 1 will be described. FIG. 6 is a diagram illustrating an example of extraction processing of cropping an image of a document region from image data by the image processing system. At step S100, the image processing system 1 takes image data as input. At step S101, the image processing system 1 sets the scanning direction of scanning edge points in image data to the main scanning direction at the time of image reading by the image reading device 10.

At step S102, the image processing system 1 detects a first candidate of edge point by pattern matching processing in a plurality of scanning lines along the scanning direction. A scanning line is a pixel line that scans pixels in order to detect edge point in image data. Scanning lines may be arranged at an interval of one pixel or more, or may be arranged continuously with no interval.

The image processing system 1 also detects a second candidate of edge point by differential calculation processing in a plurality of scanning lines along the scanning direction.

Details of the pattern matching processing and the differential calculation processing will be described later. The pattern matching processing and the differential calculation processing may be carried out in parallel, and if the pattern matching processing and the differential calculation processing are carried out at different times, it does not matter which is carried out first.

FIG. 7A depicts an example of detection of the first candidate and the second candidate. In FIG. 7A, the rectangle r indicates the range of document region in the image data, and straight lines L1~L8 indicate scanning lines. p11~p18 indicate the first candidates detected in the scanning lines L1~L8, and p21~p28 indicate the second candidates detected in the scanning lines L1~L8. This applies also to FIG. 7B and FIG. 7C.

At step S103 of FIG. 6, the image processing system 1 carries out the edge point determination processing. In the edge point determination processing, the image processing system 1 determines either one of the first candidate and the second candidate detected in each scanning line as an edge point. Details of the edge point determination processing will be described later. The image processing system 1 may perform a pipeline processing in which, in parallel with the pattern matching processing and the differential calculation processing, the edge point determination processing is carried out for determining edge point from the first candidate and the second candidate which have already been detected.

FIG. 7B is a diagram illustrating result of determination of edge points in the edge point determination processing. For example, from the first candidate p11 and the second candidate p21 detected in the scanning line L1, the first candidate p11 is determined as the edge point. From the first candidate p12 and the second candidate p22 detected in the scanning line L2, the second candidate p22 is determined as the edge point.

At step S104 of FIG. 6, the image processing system 1 carries out the noise elimination processing. In the noise elimination processing, the image processing system 1 determines whether or not each of the edge points determined in the edge point determination processing is a noise, and eliminates the edge point that is determined to be as a noise. The noise elimination processing will be described later. The image processing system 1 may execute pipeline processing in which, in parallel with determination of edge points in the edge point determination processing, the noise elimination processing is carried out for edge points which have been already determined as edge points. FIG. 7C is a diagram illustrating the result of the noise elimination in the noise elimination processing. In the noise elimination processing, the edge points p16 and p17 on the scanning lines L6 and L7 are eliminated as a noise.

At step S105 of FIG. 6, the image processing system 1 determines whether or not scanning of edge points has been carried out both in the direction of the main scanning line and in the direction of the secondary scanning line at the time of image reading by the image reading device 10. If scanning of edge points has been carried out in both scanning directions (step S105: Y), the processing proceeds to step S107. If scanning of edge points has not been carried out in the secondary scanning direction (step S105: N), the processing proceeds to step S106. At step S106, the image processing system 1 sets the scanning direction for scanning edge points to the secondary scanning direction of the image reading device 10. Thereafter, the processing returns to step S102, and processing S102 to S105 is repeated.

At step S107, the image processing system 1 carries out the boundary line determination processing. In the boundary line determination processing, the image processing system 1 determines the edge of the document region based on the edge points determined at steps S100 to S106. At step S108, the image processing system 1 carries out the image cropping processing. In the image cropping processing, the image processing system 1 crops the image of the document region from the image data at position of the edge determined in the boundary line determination processing at step S107. Thereafter, the processing is terminated.

In the example of FIG. 6, scanning of edge points is performed along the main scanning direction of the image reading device 10, and then scanning of edge points is performed along the secondary scanning direction. In place of this, scanning of edge points may be performed first along the secondary scanning direction, and then scanning of edge points may be performed along the main scanning direction. Also, scanning of edge points along the main scanning direction may be performed in parallel with scanning of edge points along the secondary scanning direction.

<2.1.2 Pattern Matching Processing>

Next, the pattern matching processing carried out at step S102 of FIG. 6 will be described. In the pattern matching processing, the image processing system 1 binarizes the inputted image data with prescribed binarization threshold T1. The image processing system 1 scans each pixel on the scanning line by shifting focused pixel on the scanning line, and determines whether or not the focused pixel is an edge point.

Figures 8A, 8B, 8C:
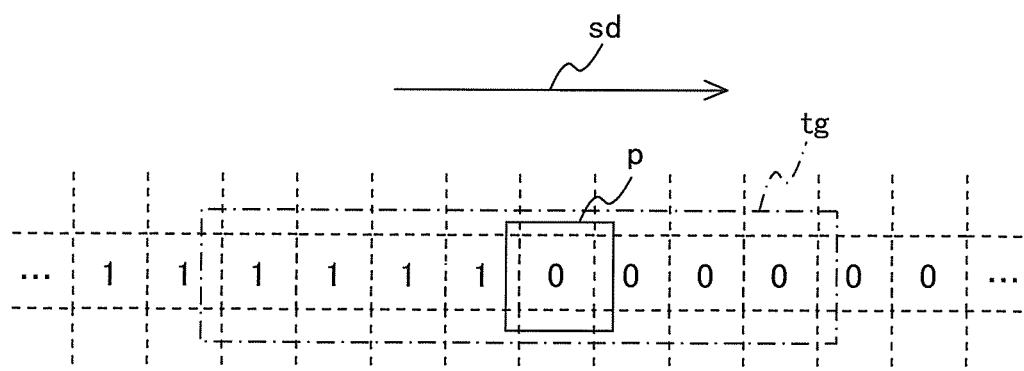
FIG. 8A is diagram illustrating an example of a pattern matching processing.
FIG. 8B is diagram illustrating an example of a pattern matching processing.
FIG. 8C is diagram illustrating an example of a pattern matching processing.

In determining whether or not the focused pixel is an edge point, the image processing system 1 compares a pixel group including the focused pixel to be inspected with a filter pattern for edge detection. FIG. 8A is a diagram illustrating an example of the inspected pixel group. In FIG. 8A, squares represented by dashed lines indicate positions of pixels in the image data, and the numerical values in the squares indicate the binarized signal of the pixel values on the scanning line. The pixel p indicates the focused pixel, and the pixel group tg in the range surrounded by long dashed short dashed lines indicate the inspected pixel group defined for the focused pixel p.

The inspected pixel group tg is a set of pixels that include the focused pixel p and are arranged along the scanning direction sd in plural numbers. In the illustrated example, the inspected pixel group tg is a set of plural pixels arranged in continuation to the focused pixel p in a row along the scanning direction. The inspected pixel group tg as depicted in FIG. 8A is an example for illustration purpose. Therefore, the inspected pixel group tg may be appropriately modified in accordance with the specification of the mounted device.

FIG. 8B and FIG. 8C are examples of filter pattern, and are respectively a pattern for left side detection and a pattern for right side detection in the case where the scanning direction sd is the main scanning direction of the image reading device 10. The image processing system 1 determines the focused pixel as the first candidate of edge point when the inspected pixel group tg coincides with the filter pattern.

<2.1.3 Differential Calculation Processing>

Figure 9:
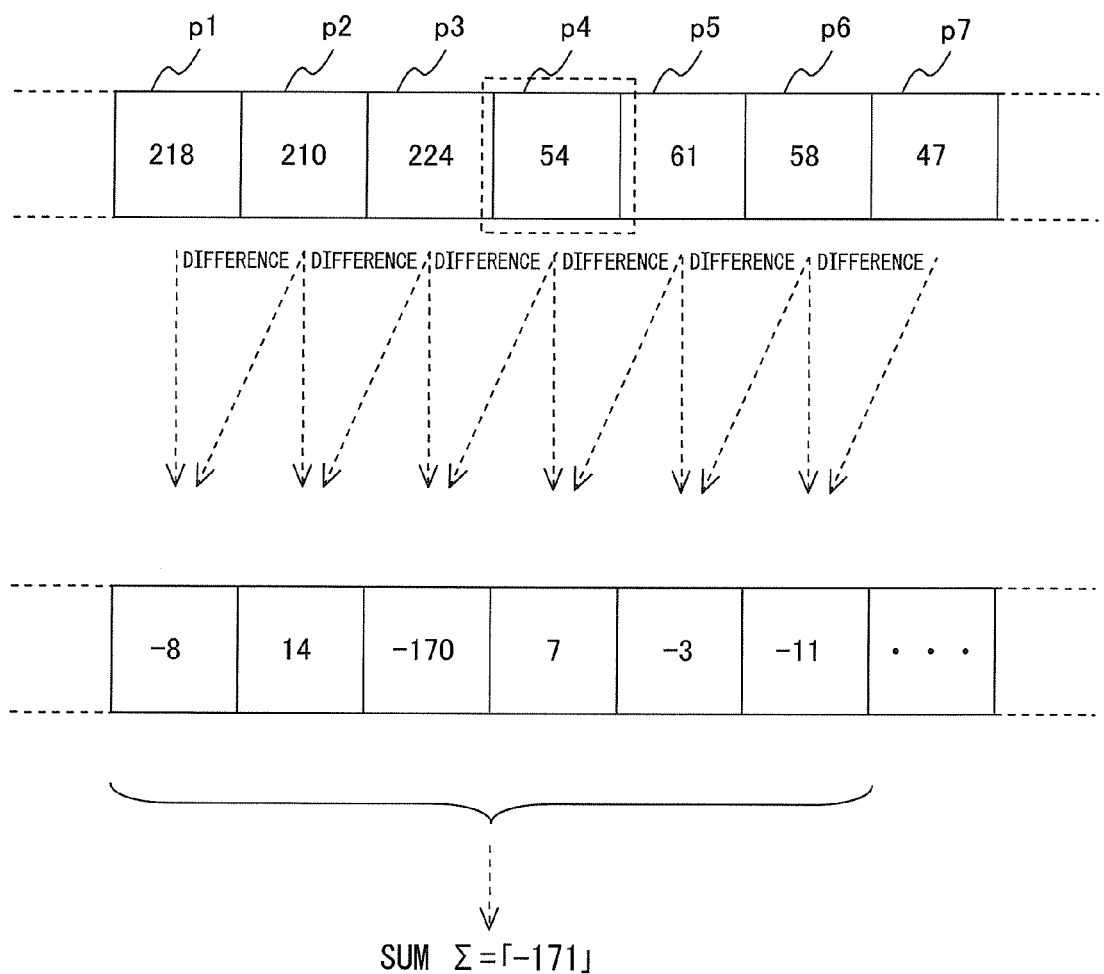
FIG. 9 is a diagram illustrating an example of differential calculation processing.

Next, the differential calculation processing carried out at step S102 of FIG. 6 will be described. FIG. 9 is a diagram illustrating the differential calculation processing. Rectangles p1 to p7 of FIG. 9 indicate pixels on a scanning line, and the numerical value in the rectangle indicate pixel value of each pixel. For example, pixel values of the pixels p1 to p7, . . . are, respectively, "218", "210", "224", "54", "61", "58", "47", . . . .

The image processing system 1 shifts the focused pixel on the scanning line in order to scan each pixel on the scanning line to determine whether or not the focused pixel is an edge point. In determining whether or not the focused pixel is an edge point, the image processing system 1 calculates difference between adjoining pixels included in the inspected pixel group including the focused pixel, as differential value of pixels included in the inspected pixel group.

The inspected pixel group is a set of pixels including the focused pixel and arranged along the scanning direction in plural numbers. In the illustrated example illustrated in FIG. 9, when the focused pixel is the pixel p4, a set consisting of pixels p1 to p7 may be defined as the inspected pixel group. Such inspected pixel group is a set of plural pixels p1 to p7 arranged in a row along the scanning direction in continuation to the focused pixel p4. The inspected pixel group in the present embodiment is an example for illustration. The inspected pixel group may vary in accordance with the specification of mounted device.

In the case of the example illustrated in FIG. 9, the image processing system 1 calculates difference between adjoining pixels p2 and p1, difference between adjoining pixels p3 and p2, difference between adjoining pixels p4 and p3, difference between adjoining pixels p5 and p4, difference between adjoining pixels p6 and p5, and difference between adjoining pixels p7 and p6. As depicted in FIG. 9, these difference values are "−8", "14", "−170", "7", "−3", and "−11".

Next, the image processing system 1 calculates sum Σ of the differential values of pixels included in the inspected pixel group, "−8", "14", "−170", "7", "−3", and "−11". In the illustrated example of FIG. 9, this sum Σ amounts to "−171". The image processing system 1 detects the focused pixel p4 as second candidate when the absolute value of the sum |Σ| calculated for the focused pixel p4 exceeds a prescribed threshold T2.

<2.1.4 Example of Detection of First Candidate and Second Candidate>

It will be illustrated below how the first candidate and the second candidate are detected in the image of edge portion, in the image at the time of noise occurrence, in the image at the time of flare occurrence, and in the image at the time of vertical line noise occurrence described above with reference to FIG. 2B, FIG. 3, FIG. 4B, and FIG. 5B.

FIG. 10A is a diagram illustrating the brightness change of pixels in the edge portion as in FIG. 2B. FIG. 10B is a diagram illustrating binarized signal of the pixel values of FIG. 10A binarized with binarization threshold T1. With the brightness change depicted in FIG. 10A, evident brightness change is produced at the position of the edge eg between the background region and the document region, so that the value of the binarized signal changes at the position of the edge eg. Therefore, in the pattern matching processing, the position of the edge eg is detected as the first candidate edge point.

FIG. 10C is a diagram illustrating the differential values calculated for the pixel values of FIG. 10A in the differential calculation processing. FIG. 10D is a diagram illustrating the absolute value of the sum |Σ| of the differential value included in the inspected pixel group. The differential value of FIG. 10C produces a marked minimum at the edge position eg where evident brightness change is produced. Therefore, when the differential value of the center pixel in the inspected pixel group is minimum, the absolute value of the sum |Σ| of the differential value included in the inspected pixel group produces a maximum of certain magnitude. Thus, in the differential calculation processing, by comparison of the absolute value of the sum |Σ| with the detection threshold T2, the position of the edge eg is detected as the second candidate.

Figure 11A:
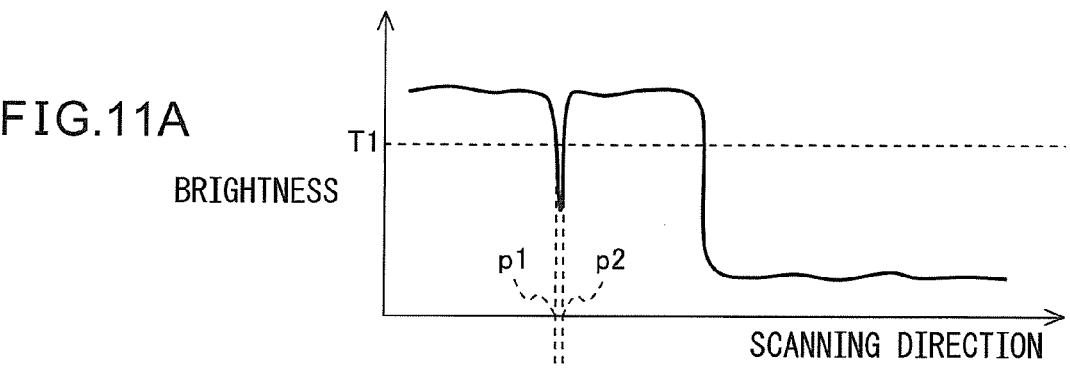
FIG. 11A is a diagram illustrating brightness change at the time of slight noise occurrence.
Figure 11B:
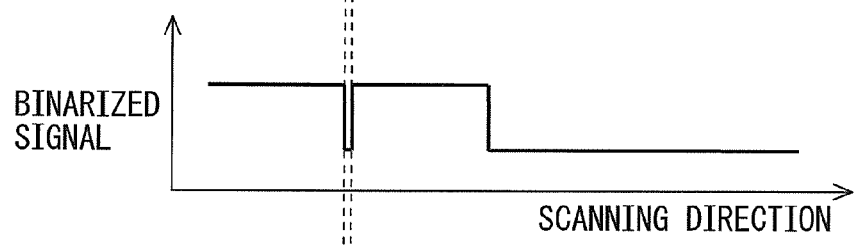
FIG. 11B is a diagram illustrating binary signal at the time of slight noise occurrence.

FIG. 11A is a diagram illustrating the brightness change of pixels at the time of slight noise occurrence. FIG. 11B is a diagram illustrating the binarized signal of the pixel value of FIG. 11A binarized with the binarization threshold T1. With the brightness change as depicted in FIG. 11A, since the brightness difference between the pixel between p1 and p2 where slight noise is present and surrounding pixels is large, the value of the binarized signal temporarily changes at pixels p1 and p2. However, if the length between pixels p1 and p2 is sufficiently small as compared to the filter pattern length, the binarized signal at the noise portion does not coincide with the filter pattern. Therefore, in the case of such slight noise, pattern matching processing does not give rise to incorrect detection.

Figure 11C:
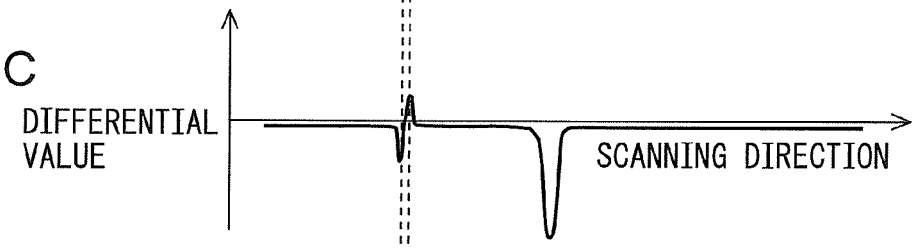
FIG. 11C is a diagram illustrating differential value at the time of slight noise occurrence.
Figure 11D:
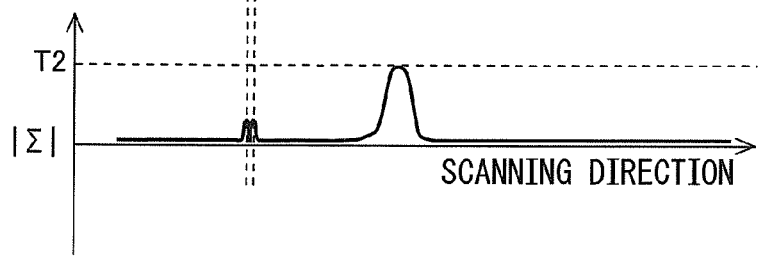
FIG. 11D is a diagram illustrating summation of differential value at the time of slight noise occurrence.

FIG. 11C is a diagram illustrating differential values calculated in the differential calculation processing for the pixel values of FIG. 11A. FIG. 11D depicts the absolute value of the sum |Σ| of the differential values included in the inspected pixel group. The differential values of FIG. 11C produce a minimum and a maximum at pixels p1 and p2. However, if the length between the pixels p1 and p2 is sufficiently small as compared to the length of the inspected pixel group, the minimum and the maximum cancel each other in the inspected pixel group. Thus, the absolute value |Σ| of the sum of the differential values included in the inspected pixel group gives a small maximum value. Therefore, in the case of slight noise, the differential calculation processing does not give rise to incorrect detection.

Figure 12A:
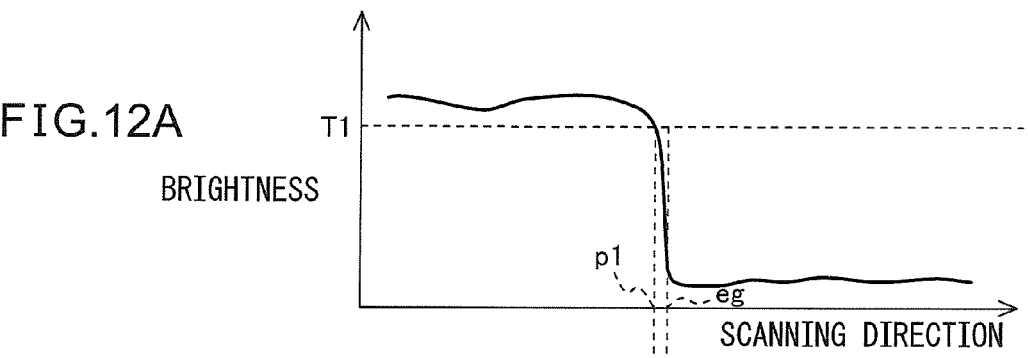
FIG. 12A is a diagram illustrating brightness change at the time of flare occurrence.
Figure 12B:
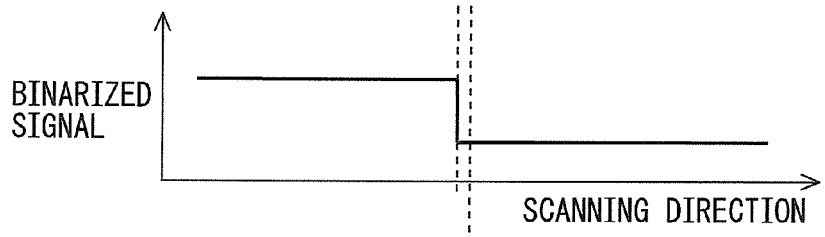
FIG. 12B is a diagram illustrating binary signal at the time of flare occurrence.

FIG. 12A is a diagram illustrating the brightness change of pixels at the time of flare occurrence similar to FIG. 4B. FIG. 12B depicts binarized signal of the pixel values of FIG. 12A binarized with the binarization threshold T1. In the brightness change depicted in FIG. 12A, the brightness gradually decreases around the position of the edge eg as the position shifts from the background region to the document region r. Thus, at a position p1 outside of the position of the edge eg, the brightness is lower than the binarization threshold T1. As a result, in the pattern matching processing, the position p1 is incorrectly detected as the first candidate of the edge point.

Figure 12C:
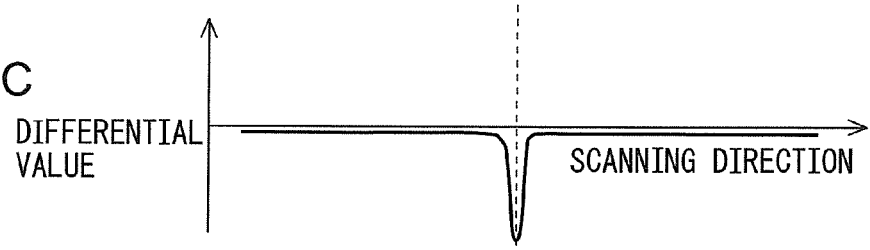
FIG. 12C is a diagram illustrating differential value at the time of flare occurrence.
Figure 12D:
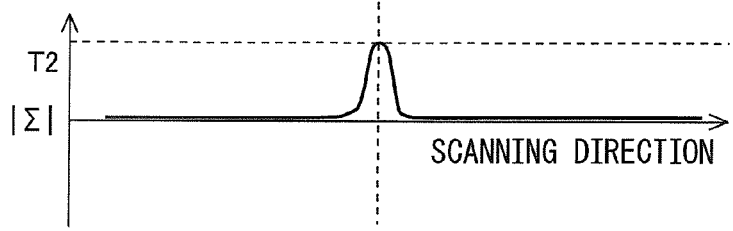
FIG. 12D is a diagram illustrating summation of differential value at the time of flare occurrence.

FIG. 12C is a diagram illustrating the differential values calculated in the differential calculation processing for the pixel values of FIG. 12A. FIG. 12D depicts the absolute value |Σ| of the sum of differential values included in the inspected pixel group. At the time of flare occurrence, the brightness change at the position of edge eg is still markedly large as compared to the surroundings. Thus, the differential values of FIG. 12C produce a marked minimum at the position of the edge eg where an evident brightness change is produced. Therefore, in the differential calculation processing, the position of the edge eg is detected as the second candidate.

Figure 13A:
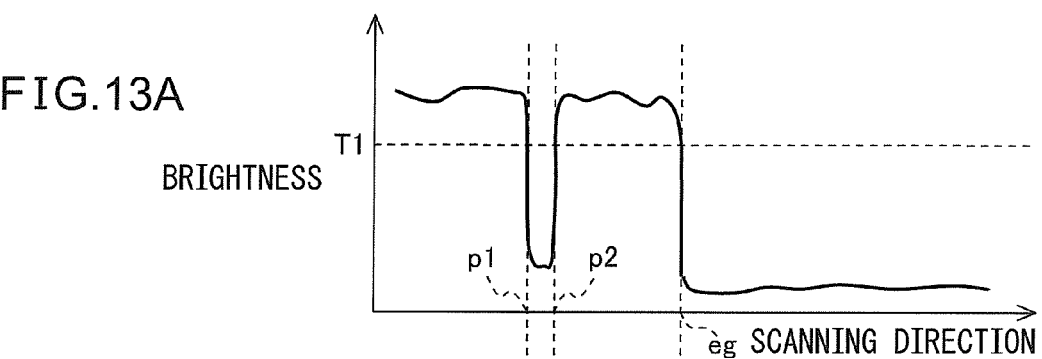
FIG. 13A is a diagram illustrating brightness change at the time of vertical line noise occurrence.
Figure 13B:
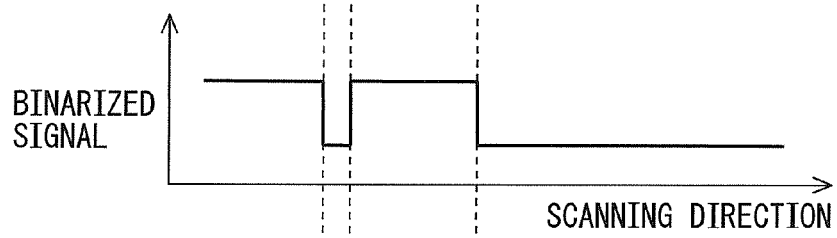
FIG. 13B is a diagram illustrating binary signal at the time of vertical line noise occurrence.

FIG. 13A is a diagram illustrating the brightness change of pixels at the time of vertical line noise occurrence similar to FIG. 5B. FIG. 13B is a diagram illustrating binarized signal of the pixel values of FIG. 13A binarized with the binarization threshold T1. In the brightness change depicted in FIG. 13A, the brightness difference between the pixels between p1 and p2 where vertical line noise is present and surrounding pixels are large, so that the value of the binarized signal changes at the pixels p1 and p2. However, if length between the pixels p1 and p2 is sufficiently small as compared to the length of the filter pattern, the binarized signal in the noise portion does not coincide with the filter pattern. Therefore, in the case of vertical line noise, the pattern matching processing does not produce incorrect detection.

Figure 13C:
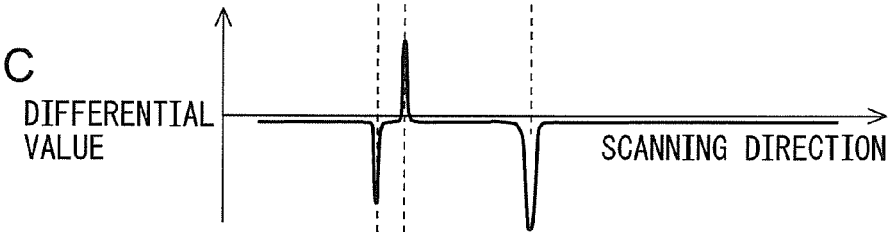
FIG. 13C is a diagram illustrating differential value at the time of vertical line noise occurrence.
Figure 13D:
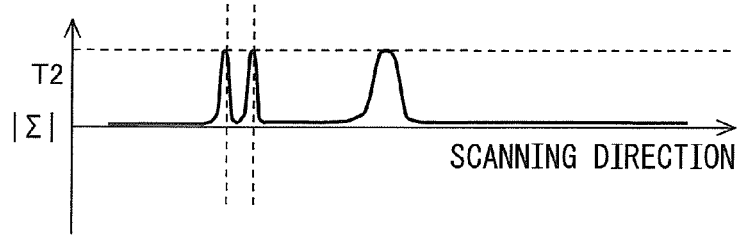
FIG. 13D is a diagram illustrating summation of differential value at the time of vertical line noise occurrence.

FIG. 13C depicts differential values calculated in the differential calculation processing for pixel values of FIG. 13A. FIG. 13D depicts the absolute value |Σ| of the sum of the differential values included in the inspected pixel group. The differential values of FIG. 13C produce the minimum and the maximum at pixels p1 and p2. In the case of vertical line noise, as compared to the case of slight noise depicted in FIG. 11C, separation of pixels p1 and p2 where the minimum and the maximum are produced is large. Therefore, length between pixels p1 and p2 is large as compared to the length of the inspected pixel group, and the minimum and the maximum do not cancel each other in the inspected pixel group. Thus, the absolute value |Σ| of the sum of the differential values included in the inspected pixel group has a large maximum value. Therefore, in the differential calculation processing, the positions of the pixels p1 and p2 of vertical line noise may be detected incorrectly as the second candidate.

As described above, features of the pattern matching processing and features of the differential calculation processing may be summarized as follows.

(1) In the case where flare does not occur, the first candidate and the second candidate indicate correct edge position.

(2) Slight noise does not lead to incorrect detection of the first candidate and the second candidate.

(3) At the time of flare occurrence, the second candidate indicates correct edge position, but the first candidate may indicate a position outside of the correct edge position.

(4) At the time of vertical line noise occurrence, it is not incorrectly detected as the first candidate, but may be incorrectly detected as the second candidate.

<2.1.5 Edge Point Determination Processing>

Figure 14A:
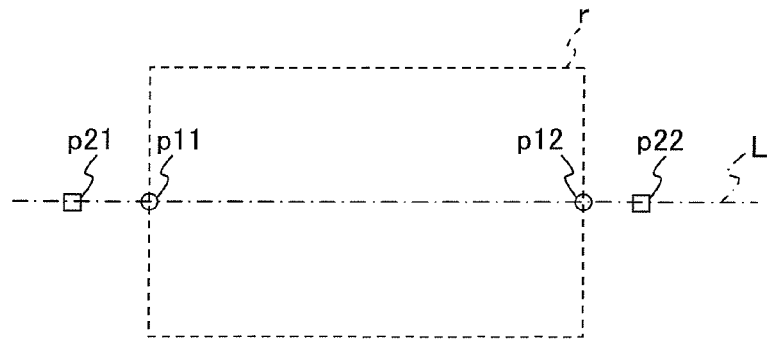
FIG. 14A is a diagram illustrating an example of edge point determination processing.
Figure 14B:
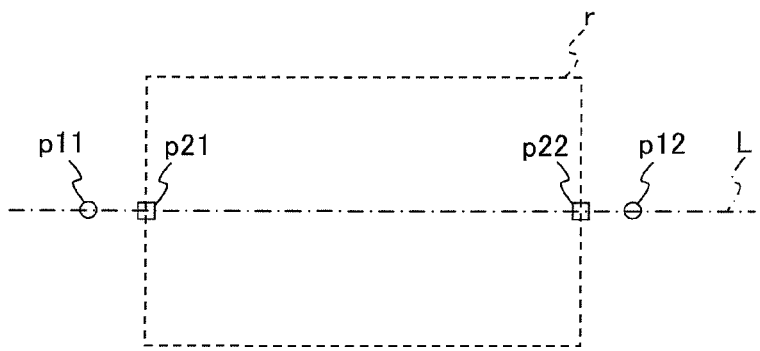
FIG. 14B is a diagram illustrating an example of edge point determination processing.

Next, the edge point determination processing carried out at step S103 of FIG. 6 will be described. FIG. 14A and FIG. 14B are diagrams illustrating a first example of the edge point determination processing. In FIG. 14A and FIG. 14B, the rectangle r indicates the range of the document region, and the line L indicates a scanning line along the main scanning direction of the image reading device 10, p11 and p12 indicate the first candidates on the left side and the right side, and p21 and p22 indicate the second candidates on the left side and the right side. This applies also to FIG. 14C. When a scanning line is set to the secondary scanning direction of the image reading device 10, the processing is similar.

As has been described above in the section 2.1.4(3), at the time of flare occurrence, the first candidate may indicate a position outside of the second candidate. Therefore, if the position of the second candidate is outside of the first candidate as shown in FIG. 14A, it indicates that flare does not occur, and therefore, the image processing system 1 determines the first candidate as an edge point. On the other hand, when position of the second candidate is inside of the first candidate as depicted in FIG. 14B, it indicates occurrence of flare, and therefore, the image processing system 1 determines the second candidate as an edge point.

By selecting the second candidate as an edge point only when the position of the second candidate is inside of the first candidate, incorrectly detected second candidate due to causes other than flare, for example, due to vertical line noise in the background region, or the like, can be prevented from being adopted as an edge point.

Figure 14C:
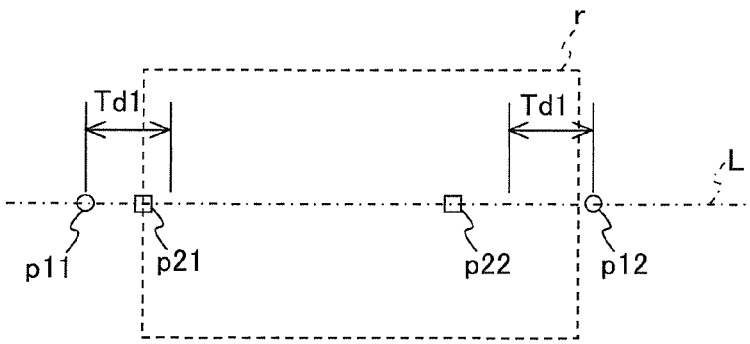
FIG. 14C is a diagram illustrating an example of edge point determination processing.

FIG. 14C is a diagram illustrating a second example of the edge point determination processing. Even when the position of the first candidate is shifted, due to occurrence of flare, outside of the position of the second candidate that indicates correct position of the edge point, the amount of shift is supposed to be not greater than a certain range. Therefore, the image processing system 1 determines the second candidate as the edge point if the position of the second candidate is inside of the first candidate, and separation of the first candidate and the second candidate is within a prescribed distance Td1, and otherwise determines the first candidate as the edge point. For example, in the case depicted in FIG. 14C, since the separation of the first candidate p11 on the left side and the second candidate p21 inside of it is within the prescribed distance Td1, the second candidate p21 is determined as an edge point. Also, since the separation between the first candidate p12 on the right side and the second candidate p22 inside of it exceeds the prescribed distance Td1, the first candidate is determined as an edge point. By further restricting the position of the second candidate that can be adopted as an edge point in this manner, possibility of the second candidate that is incorrectly detected due to causes other than flare being determined as an edge point can be reduced.

Scanning of pixels in the pattern matching processing and the differential calculation processing may be performed in a constant direction. For example, while the image reading device 10 is scanning the document, it may generate image data successively, and the first candidate and the second candidate of edge point may be successively detected starting from the generated image data.

For example, in the case where image data are successively generated from the document from the left side to the right side of the document, the pattern matching processing and the differential calculation processing scan the generated pixels successively as the image data are generated by scanning the document. In this case, in the edge point determination processing, the image processing system 1, in determining an edge on the left side, may determine the second candidate as an edge point if, after the first candidate is detected, the second candidate is detected within the prescribed distance Td1 from the first candidate. If pixels exceeding the prescribed distance from the first candidate are scanned and the second candidate has not been detected, the first candidate may be detected as an edge point.

In determining edge on the right side, the image processing system 1 determines the second candidate as an edge point if, after the second candidate has been detected, the first candidate is detected within the prescribed distance Td1 from the second candidate. If the first candidate is not detected within the prescribed distance Td1 from the second candidate, the second candidate is discarded, and the first candidate detected thereafter is determined as an edge point.

<2.1.6 Noise Elimination Processing>

Next, the noise elimination processing carried out at step S104 of FIG. 6 will be described. In the noise elimination processing, the image processing system 1 focuses on respective edge points detected on each of the scanning lines. If the distance between the focused edge point and other edge point detected on the adjoining line adjacent to the detection line of the focused edge point is larger than a prescribed distance Td2, the image processing system 1 determines that the focused edge point is noise and eliminates the focused edge point from the edge points of the document region.

Figure 15:
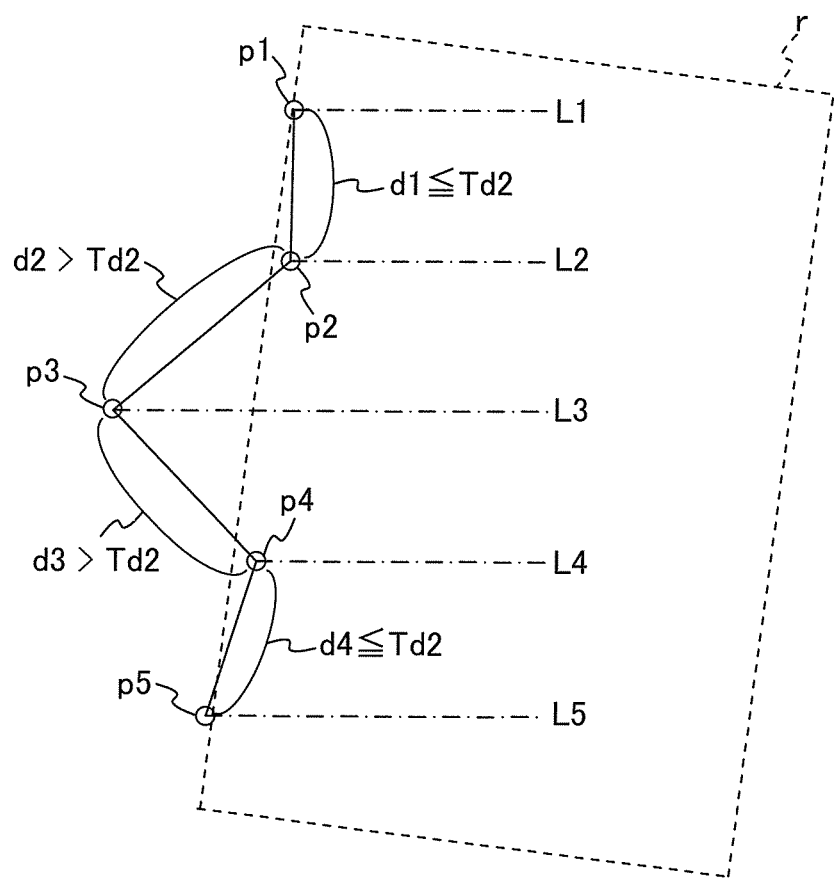
FIG. 15 is a diagram illustrating a first example of noise elimination processing.

FIG. 15 is a diagram illustrating a first example of the noise elimination processing. In FIG. 15, the rectangle r indicates the range of the document region in the image data, lines L1 to L5 indicate scanning lines, and p1 to p5 indicate edge points detected on the scanning lines L1 to L5. Scanning line L2 is adjacent to scanning lines L1 and L3. Scanning line L4 is adjacent to scanning lines L3 and L5.

Edge points p1, p2, p3, p4, and p5 are focused on in this order. When focused edge points are p2 and p5, the focused edge points p2 and p5 are within the prescribed distance Td2 from the edge points p1 and p4 on the adjoining lines focused immediately before, and so, the focused edge points p2 and p5 are not eliminated as a noise. On the other hand, when the focused edge points are edge points p3 and p4, the focused edge points p3 and p4 are not within the prescribed distance Td2 from the edge points p2 and p3 on the adjoining lines focused immediately before, and therefore, the focused edge points p3 and p4 are eliminated as a noise.

2.2. Construction of Apparatus

Figure 16:
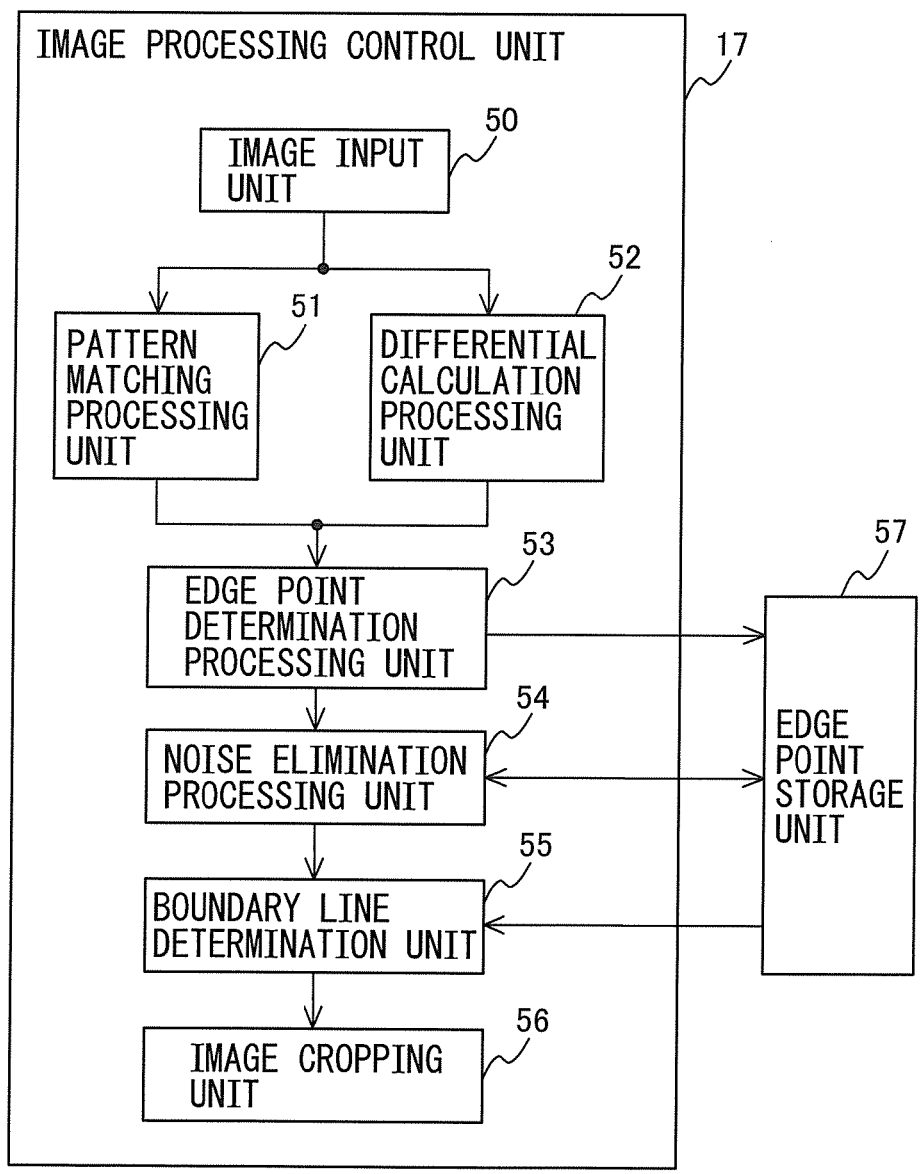
FIG. 16 is a diagram illustrating an exemplary construction of an image processing control unit.

Next, the construction of the image processing control apparatus 17 will be described. FIG. 16 is a diagram illustrating an exemplary construction of the image processing control apparatus 17. The image processing control apparatus 17 includes an image input unit 50, a pattern matching processing unit 51, a differential calculation processing unit 52, an edge point determination processing unit 53, a noise elimination processing unit 54, a boundary line determination unit 55, and an image cropping unit 56. FIG. 16 illustrates mainly those functions related to the description that follows. So, the image processing control apparatus 17 may include components other than those depicted here. Coordinate data of edge points stored in the edge point storage unit 57 are stored in memory 12.

In another embodiment, a part or all of the processing performed by the image input unit 50, the pattern matching processing unit 51, the differential calculation processing unit 52, the edge point determination processing unit 53, the noise elimination processing unit 54, the boundary line determination unit 55, and the image cropping unit 56 may be performed by CPU 11 in place of the image processing control apparatus 17. Also in another embodiment, a part or all of these processing may be performed by CPU 31 of the computer 30. The computer 30 may store coordinate data of the edge points in the memory 33 as the edge point storage unit 57.

Computer program that causes CPU 31 to execute these information processing may be recorded in a computer-readable, non-transitory medium such as a CD ROM, a DVD ROM, a flexible disc drive, a CD-R or a DVD-R, a MO, a flash memory drive, or the like and read by the medium reading unit 36 and installed in the auxiliary storage unit 32 by using a well known setup program or the like. The computer program may be downloaded via a network interface (not depicted) from a network and may be installed in the auxiliary storage device 32.

The image input unit 50 takes image data as input. The pattern matching processing unit 51 executes the pattern matching processing as described above in section 2.1.2 to detect the first candidate of an edge point. The differential calculation processing unit 52 executes the differential calculation processing as described above in section 2.1.3 to detect the second candidate of an edge point.

The edge point determination processing unit 53 executes the edge point determination processing as described above in section 2.1.5 to determine one of the first candidate and the second candidate as an edge point of the document region. The edge point determination processing unit 53 stores coordinate data of the determined edge point in the edge point storage unit 57. The noise elimination processing unit 54 executes the noise elimination processing as described above in section 2.1.6 to determine whether or not each of the wedge points determined by the edge point determination processing unit 53 is noise and to eliminate coordinate data of the edge point determined to be noise from the edge point storage unit 57.

The boundary line determination unit 55 determines the edge of the document region based on the edge points that remains after the noise elimination processing. The image cropping unit 56 crops out an image of the document region from the image data at the position of the edge determined by the boundary line determination unit 55.

Next, the processing performed by the pattern matching processing unit 51, the differential calculation processing unit 52, the edge point determination processing unit 53 and the noise elimination processing unit 54 will be described. In the description that follows, the case where edge points are scanned along the main scanning direction of the image reading device 10 is described. Processing is the same when edge points are scanned along the secondary scanning direction of the image reading device 10.

<2.2.1 Pattern Matching Processing Unit>

Figure 17:
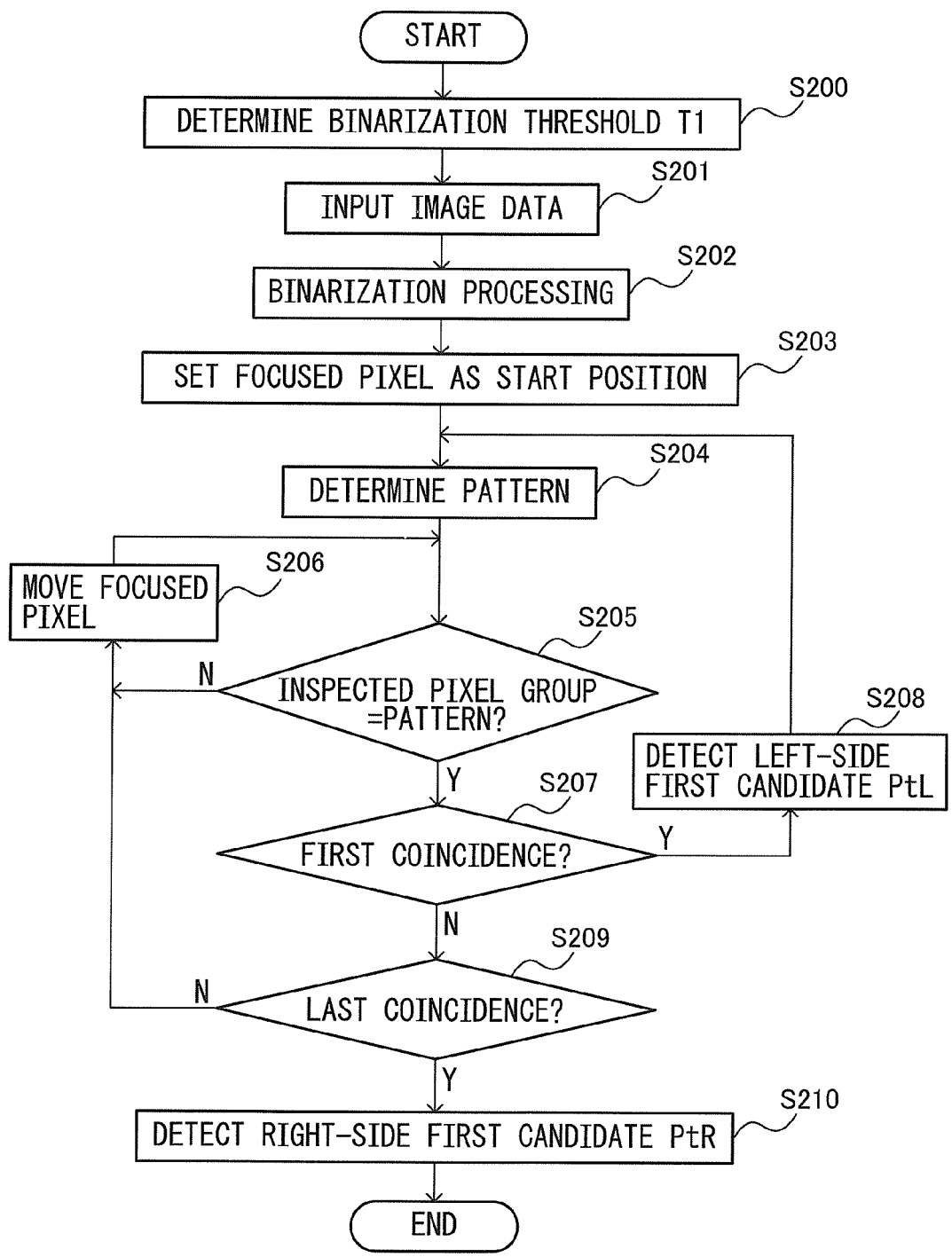
FIG. 17 is a diagram illustrating an example of processing performed by the pattern matching processing unit.

FIG. 17 is a diagram illustrating an example of the processing performed in one scanning line by the pattern matching processing unit 51. At step S200, the pattern matching processing unit 51 determines the binarization threshold T1. At step S201, the pattern matching processing unit 51 takes the image data as input. At step S202, the pattern matching processing unit 51 binarizes the image data with the binarization threshold T1.

At step S203, the pattern matching processing unit 51 sets the position of the focused pixel to the prescribed scan start position on the scanning line. At step S204, the pattern matching processing unit 51 determines the filter pattern to be compared with the inspected pixel group defined for the focused pixel. In this case, a left side detection pattern is used.

At step S205, the pattern matching processing unit 51 determines whether or not the inspected pixel group defined for the focused pixel coincides with the filter pattern. If the inspected pixel group coincides with the filter pattern (step S205: Y), the processing proceeds to step S207. If the inspected pixel group does not coincide with the filter pattern (step S205: N), the processing proceeds to step S206. At step S206, the pattern matching processing unit 51 shifts position of the focused pixel to the right by one pixel, and returns the processing to step S205.

At step S207, the pattern matching processing unit 51 determines whether or not the coincidence of pattern at step S205 is the first coincidence on the current scanning line. If the coincidence of pattern at step S205 is the first coincidence on the current scanning line (step S207: Y), the processing proceeds to step S208. If the coincidence of pattern at step S205 is not the first coincidence on the current scanning line (step S207: N), the processing proceeds to step S209.

At step S208, the pattern matching processing unit 51 determines the focused pixel to be the first candidate PtL on the left side, and stores the first candidate PtL in the memory 12. Thereafter, the pattern matching processing unit 51 returns the processing to step S204. At step S204, the pattern matching processing unit 51 changes the filter pattern to be used to a right side detection pattern, and then returns the processing to step S205.

At step S209, the pattern matching processing unit 51 determines whether or not the coincidence of pattern at step S205 is the last coincidence on the current scanning line. For example, the pattern matching processing unit 51 may determine whether or not the coincidence of pattern at step S205 is the last coincidence on the current scanning line as follows: if, after coincidence of pattern at step S205, the focused pixel reaches the scan end position without further coincidence of the inspected pixel group with the filter pattern, the pattern matching processing unit 51 may determine it to be the last coincidence. On the contrary, if, after coincidence of pattern at step S205, in the way of the focused pixel to the scan end position, the inspected pixel group coincides with the filter pattern again, the pattern matching processing unit 51 may determine that the former coincidence is not the last coincidence. If the coincidence at step S205 is the last coincidence (step S209: Y), the processing proceeds to step S210. If the coincidence at step S205 is not the last coincidence (step S209: N), the processing proceeds to step S206.

At step S210, the pattern matching processing unit 51 determines that the focused pixel is the first candidate PtR on the right side, and stores the first candidate PtR in the memory 12. Thereafter, the processing is terminated.

<2.2.2 Differential Calculation Processing Unit>

Figure 18:
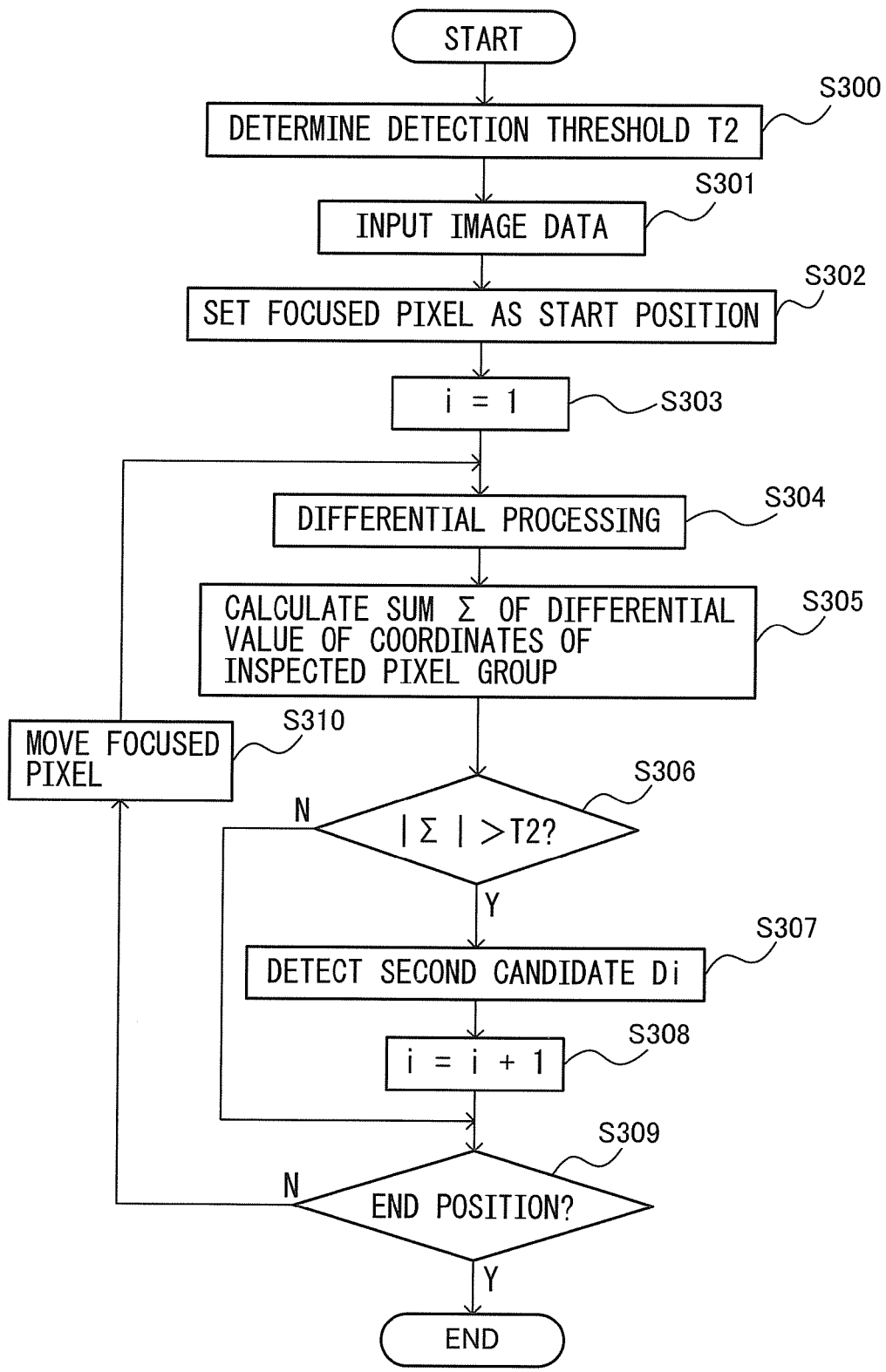
FIG. 18 is a diagram illustrating an example of processing performed by the differential calculation processing unit.

Next, the processing performed by the differential calculation processing unit 52 will be described. FIG. 18 is a diagram illustrating an example of processing performed by the differential calculation processing unit 52 on one scanning line. At step S300, the differential calculation processing unit 52 determines a detection threshold T2. At step S301, the differential calculation processing unit 52 takes image data as input. At step S302, the differential calculation processing unit 52 sets the position of the focused pixel to a predetermined scan starting position on the scanning line.

At step S303, the value of the variable i is set to "1". At step S304, the differential calculation processing unit 52 calculates differential values for pixels included in the inspected pixel group defined for the focused pixel. At step S305, the differential calculation processing unit 52 calculates the sum E of the differential values included in the inspected pixel group.

At step S306, the differential calculation processing unit 52 determines whether or not the absolute value of the sum |Σ| exceeds the detection threshold T2. If the absolute value of the sum |Σ| exceeds the detection threshold T2 (step S306: Y), the processing proceeds to step S307. If the absolute value of the sum |Σ| does not exceed the detection threshold T2 (step S306: N), step S307 is skipped, and the processing proceeds to step S309.

At step S307, the differential calculation processing unit 52 determines the focused pixel as the second candidate. The differential calculation processing unit 52 stores the i-th second candidate in the memory 12, and add it to the $1^{st}$ to the (i−1)-th second candidates, D1 to D(i−1). At step S308, the differential calculation processing unit 52 increments the value of the variable i, and the processing proceeds to step S309. At step S309, the differential calculation processing unit 52 determines whether or not the focused pixel reaches the scan end position on the scanning line. If the focused pixel reaches the scan end position (step S309: Y), the processing is terminated. If the focused pixel does not reach the scan end position (step S309: N), the processing proceeds to step S310. At step S310, the differential calculation processing unit 52 shifts the position of the focused pixel to the right by one pixel, and returns the processing to step S304.

<2.2.3 Edge Point Determination Processing Unit>

Figure 19:
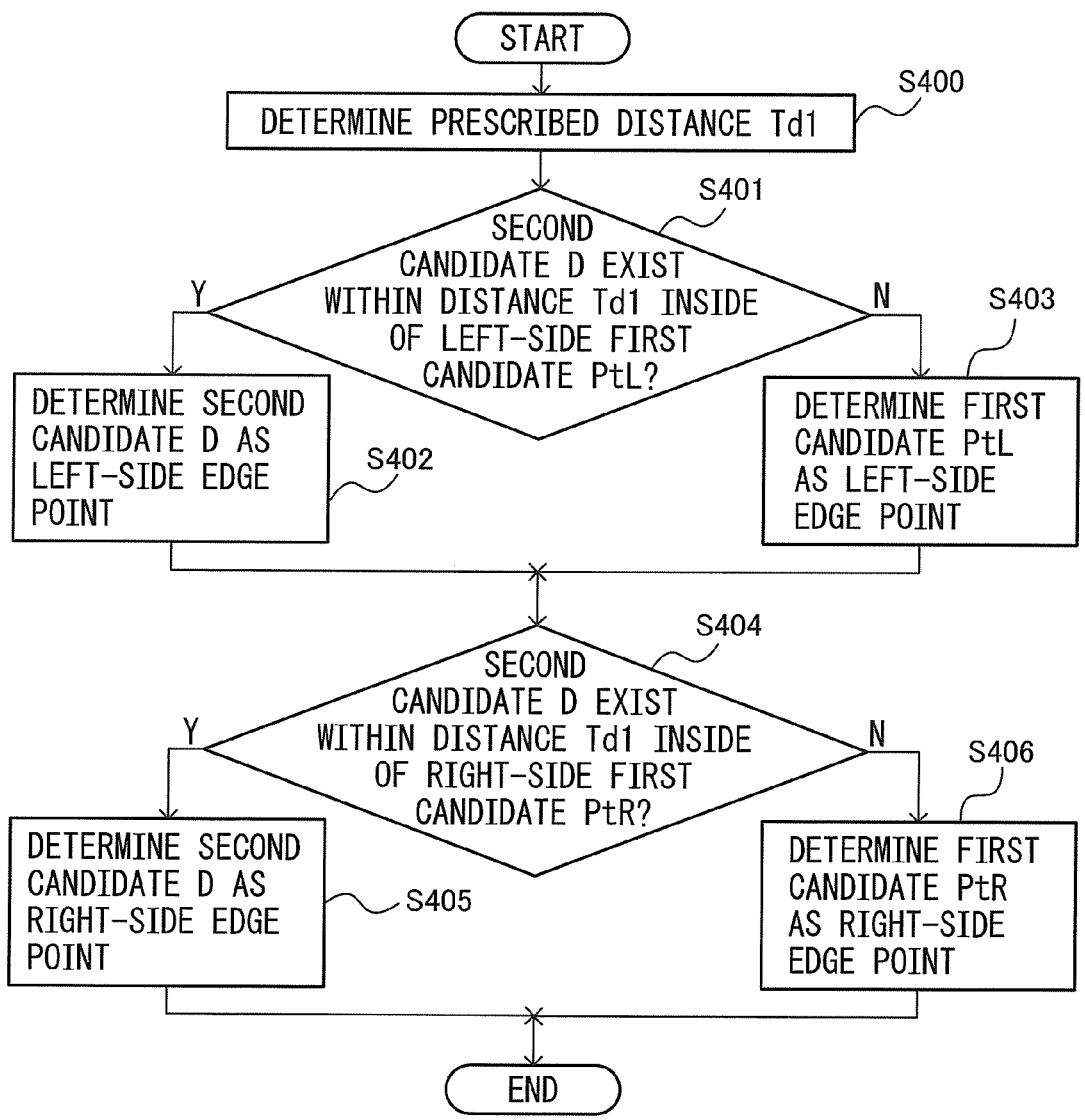
FIG. 19 is a diagram illustrating an example of processing performed by the edge point determination processing unit.
Figure 20:
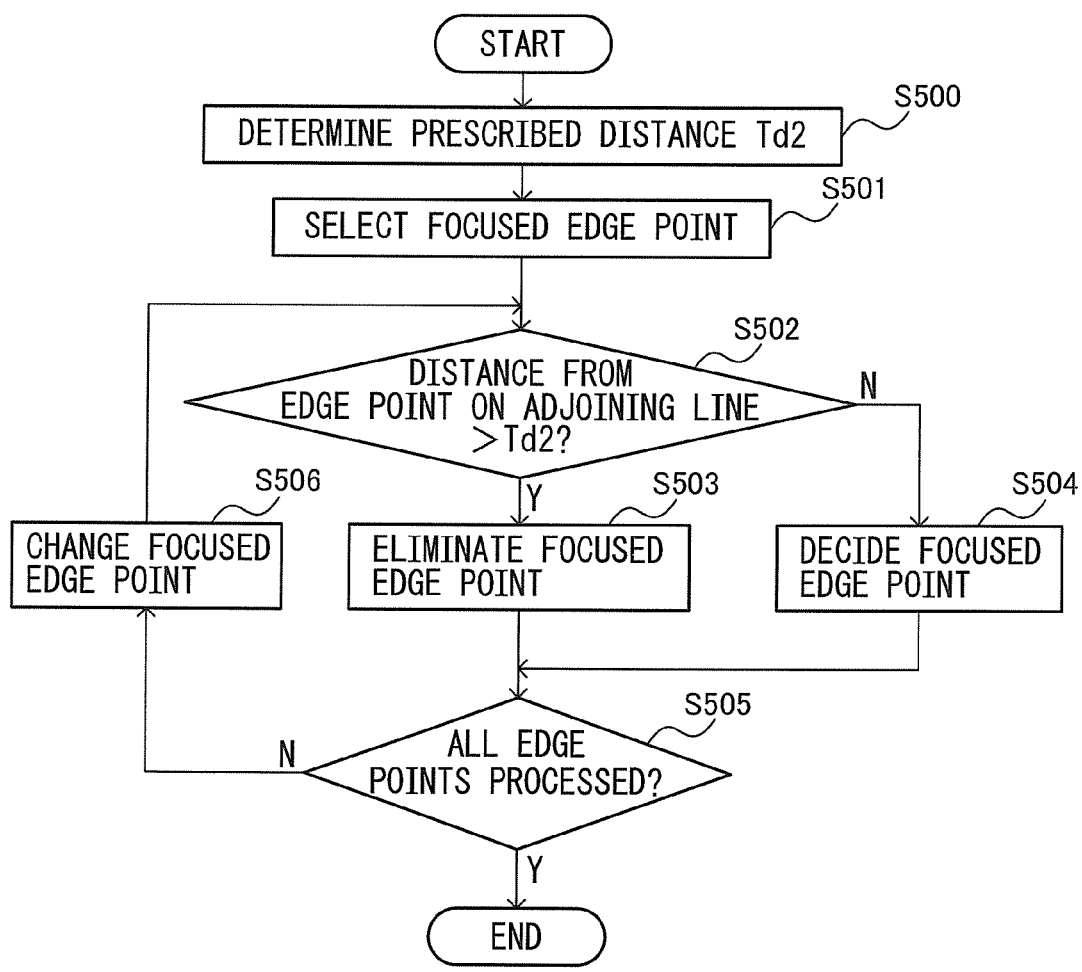
FIG. 20 is a diagram illustrating an example of processing performed by the noise elimination processing unit.

Next, the processing performed by the edge point determination processing unit 53 will be described. FIG. 19 is a diagram illustrating an example of the processing performed by the edge point determination processing unit 53. At step S400, the edge point determination processing unit 53 determines a prescribed distance Td1. Prescribed distance Td1 defines how near the second candidate D inside of the first candidates PtL and PtR needs to be to the first candidates PtL and PtR in order to be determined as an edge point.

At step S401, the edge point determination processing unit 53 determines whether or not the second candidate D exists inside of the left-side first candidate PtL within the prescribed distance Td1. If the second candidate D exists inside of the first candidate PtL within the prescribed distance Td1 (step S401: Y), the processing proceeds to step S402, and otherwise (step S401: N), the processing proceeds to S402, and otherwise (step S401: N), the processing proceeds to step S403.

At step S402, the edge point determination processing unit 53 determines the second candidate D existing inside of the first candidate PtL within the prescribed distance Td1 as an edge point on the left side. The edge point determination processing unit 53 stores the determined edge point on the left side in the edge point storage unit 57. Thereafter, the processing proceeds to step S404. At step S403, the edge point determination processing unit 53 determines the first candidate PtL as an edge point on the left side. The edge point determination processing unit 53 stores the determined edge point on the left side in the edge point storage unit 57. Thereafter, the processing proceeds to step S404.

At step S404, the edge point determination processing unit 53 determines whether or not the second candidate D exists inside of the first candidate PtR on the right side and within the prescribed distance Td1. If the second candidate D exists inside of the first candidate PtR on the right side and within the prescribed distance Td1 (step S404: Y), the processing proceeds to step S405, and otherwise (step S404: N), the processing proceeds to step S406.

At step S405, the edge point determination processing unit 53 determines the second candidate D existing inside of the first candidate PtR within the prescribed distance Td1 as an edge point on the right side. The edge point determination processing unit 53 stores the determined edge point on the right side in the edge point storage unit 57. Thereafter, the processing is terminated. At step S406, the edge point determination processing unit 53 determines the first candidate PtR as an edge point on the right side. The edge point determination processing unit 53 stores the determined edge point on the right side in the edge point storage unit 57. Thereafter, the processing is terminated.

<2.2.4 Noise Elimination Processing Unit>

Next, the processing performed by the noise elimination processing unit 54 will be described. At step S500, the noise elimination processing unit 54 determines a prescribed distance Td2. The prescribed distance Td2 defines how far edge points detected on adjoining lines needs to be separated in order to be determined as a noise.

At step S501, the noise elimination processing unit 54 selects a focused edge point from the edge points determined by the edge point determination processing unit 53. At step S502, the noise elimination processing unit 54 determines whether or not the distance between the focused edge point and other edge point detected on the scanning line adjoining the scanning line on which the focused edge point is detected is larger than the prescribed distance Td2. If the distance between the other edge point and the focused edge point is larger than the prescribed distance Td2 (step S502: Y), the processing proceeds to step S503. If the distance between the other edge point and the focused edge point is not larger than the prescribed distance Td2 (step S502: N), the processing proceeds to step S504.

At step S503, the noise elimination processing unit 54 eliminates the coordinate data of the focused edge point from the edge point storage unit 57. Thereafter, the processing proceeds to step S505. At step S504, the noise elimination processing unit 54 decides the focused edge point as an edge point constituting an edge of the document region. Thereafter, the processing proceeds to step S505.

At step S505, the noise elimination processing unit 54 determines whether or not all the edge points have been processed at steps S501 to S504. If all the edge points have been processed (step S505: Y), the processing is terminated. If there is an edge point that has not been processed (step S505: N), the processing proceeds to step S506. At step S506, the noise elimination processing unit 54 selects the unprocessed edge point as focused edge point. Thereafter, the processing proceeds to step S502.

2.3. Effect of the Embodiment

With the present embodiment, since the differential calculation processing suitable for edge detection at the time of flare occurrence is used, detection accuracy of edge detection at the time of flare occurrence is improved. Further, in the present embodiment, occurrence of flare is determined by positional relation of the second candidate detected by the differential calculation processing and the first candidate detected by other detection processing (in this example, the pattern matching processing), and the detection result of the differential calculation processing is used. Thus, possibility of incorrect detection of the differential calculation processing due to causes other than flare can be reduced.

Also, with the present embodiment, even if the edge point selected from the first candidate and the second candidate is incorrectly detected coordinate, the noise elimination processing can eliminate the incorrect detection as a noise by determining the continuity of edge points. With this processing, possibility of incorrect detection can be further reduced.

In detecting edge points, the detection accuracy for detecting edge points can be improved by increasing pixel density and number of pixels to be scanned. However, increase of the number of pixels to be scanned means increase of the capacity of memory for storing the pixel information and increase of the burden of detection processing and consumed electric power. Therefore, in order to avoid these problems, it is also conceivable to reduce the number of pixels to be scanned.

Figure 21A:
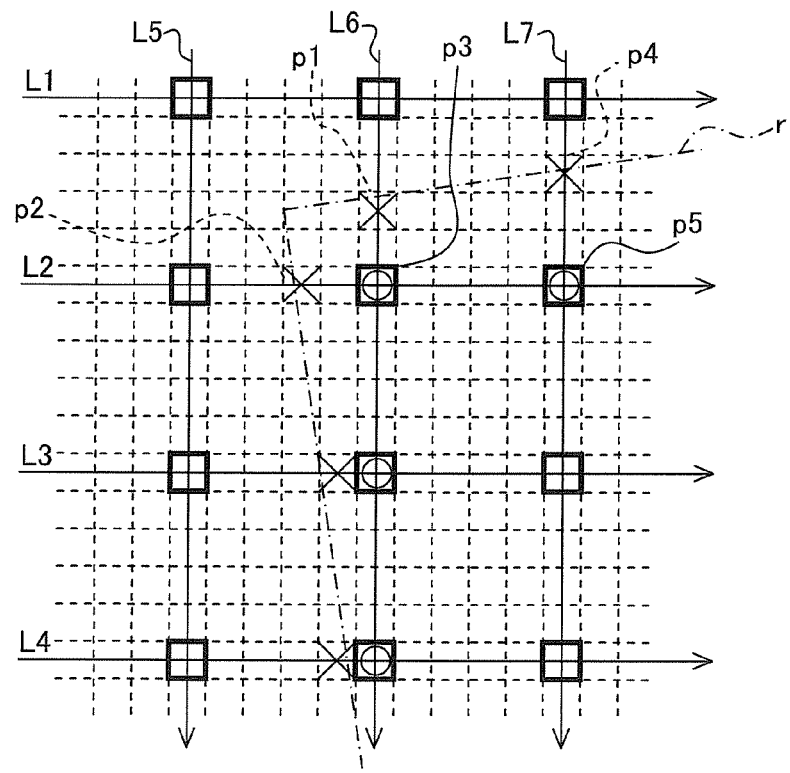
FIG. 21A is a diagram illustrating focused pixels to be scanned.
Figure 21B:
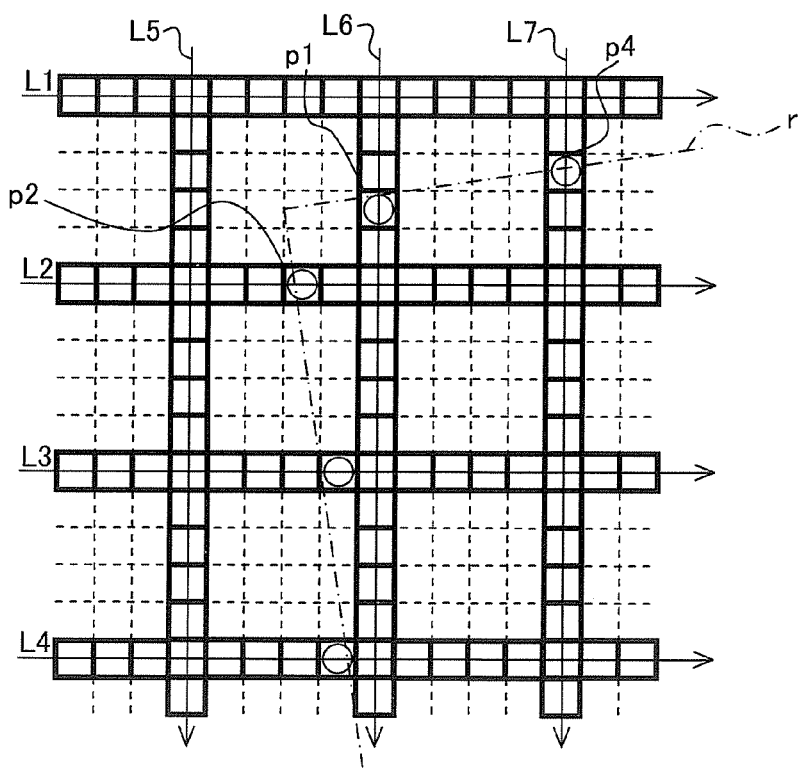
FIG. 21B is a diagram illustrating focused pixels to be scanned.

FIG. 21A and FIG. 21B are diagrams illustrating pixels to be scanned when the number of pixels to be scanned is reduced. Squares partitioned by dotted lines indicate positions of pixels, and alternate long and short dashed line r indicates a position of the document region in the image data. Straight lines L1 to L7 are scanning lines for scanning pixels to detect edge points, and the scanning lines L1 to L4 extend along the main scanning direction, and scanning lines L5~L7 extend along the secondary scanning direction. Rectangles in solid lines indicate pixels to be scanned.

In the example illustrated in FIG. 21A, the scanning lines are arranged in intervals of a plurality of pixels, and in one scanning line, edge is detected in pixels separated by a plurality of pixels. Thus, for example, the edge point p2 in the document region r on the scanning line L2 is detected at the position of the pixel p3 to be scanned. Also, edge points p1 and p4 in the document region r on the scanning lines L6 and L7 are detected at positions of the pixels p3 and p5 to be scanned. Therefore, in the example of FIG. 21A, positional error is produced in accordance with the reduced number of pixels.

In the example illustrated in FIG. 21B, although scanning lines are arranged in separation of a plurality of pixels, edge is detected in one scanning line in continuous pixels. Thus, for example, the edge point p2 in the document region r on the scanning line L2, and the edge points p1 and p4 in the document region r on the scanning lines L6 and L7, are detected in the original positions p2, p1, and p4, respectively. Thus, in the example of FIG. 21B, only positional error corresponding to the pixel density of the image data is produced. Therefore, by reducing the pixels to be scanned as in FIG. 21B, memory capacity, amount of the detection processing and consumed electric power can be reduced while maintaining detection accuracy.

3. Another Example

Figure 22A:
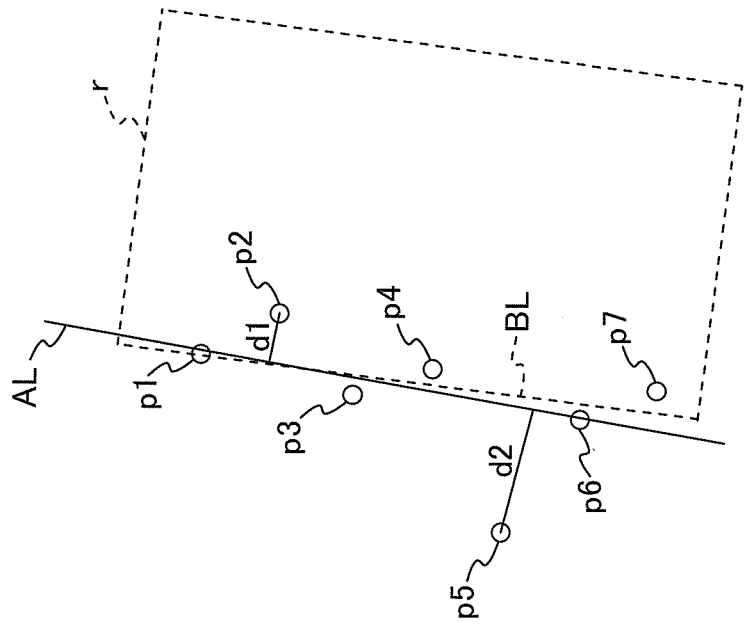
FIG. 22A is a diagram illustrating a second example of noise elimination processing.

Next, another example of the image processing control unit 17 will be described. FIG. 22A is a diagram illustrating a second example of the noise elimination processing unit 54. The noise elimination processing unit 54 determines the focused edge point as a noise if the straight line connecting the focused edge point to an edge point on adjoining line makes an angle larger than a prescribed angle with the direction perpendicular to the scanning line. For example, the noise elimination processing unit 54 determines whether or not the angle θ1 which the straight line L1 connecting the focused pixel p2 to the edge point p1 on the adjoining line focused just before makes with the direction rd perpendicular to the scanning line is larger than a prescribed angle. If the angle θ1 is not larger than the prescribed angle, the noise elimination processing unit 54 does not eliminate the pixel p2 as a noise, and determines it to be an edge point in the document region.

On the other hand, the noise elimination processing unit 54 determines whether or not the angle θ2 which the straight line L2 connecting the focused pixel p3 to an edge point p2 on the adjoining line focused just before makes with the direction rd is larger than the prescribed angle. If the angle θ2 is larger than the prescribed angle, the noise elimination processing unit 54 eliminates the focused pixel p3 as a noise.

With this processing, the noise elimination processing unit 54 can eliminate an incorrectly detected edge point. When separation of scanning lines is known in advance, coordinate value of the edge point in the direction of coordinate axis along the scanning line may be used to determine whether or not the straight line connecting it to an edge point on the adjoining line makes an angle larger than the prescribed angle with the direction rd.

Figure 22B:
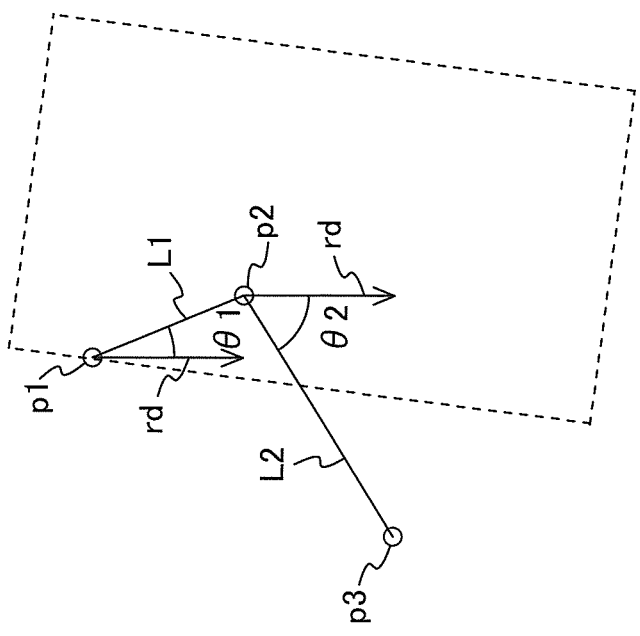
FIG. 22B is a diagram illustrating a third example of noise elimination processing.

FIG. 22B is a diagram illustrating a third example of the noise elimination processing unit 54. The noise elimination processing unit 54 calculates an approximate straight line AL for the boundary line BL of the document region r based on edge points p1 to p7 determined on a plurality of scanning lines. The noise elimination processing unit 54 may calculate the approximate straight line AL, for example, by Hough transformation, by the least square method, etc. The noise elimination processing unit 54 may determine the focused edge point as a noise if the distance between the approximate straight line AL and the focused edge point is larger than a prescribed length. For example, the noise elimination processing unit 54 does not eliminate an edge point p2 at a distance d1 not larger than the prescribed length from the approximate straight line AL as a noise, and decides it as an edge point in the document region. On the other hand, the noise elimination processing unit 54 eliminates an edge point p5 at a distance d2 larger than the prescribed length as a noise.

With this processing too, the noise elimination processing unit 54 can eliminate an incorrectly detected edge point. In the first example of the noise elimination processing described with reference to FIG. 15, if an edge point on the adjoining line from which the distance of the focused edge point is determined is a noise, the focused edge point detected near an edge may be eliminated as a noise. The edge point p4 depicted in FIG. 15 is detected near an edge of the document region r, but since the edge point p3 on adjoining line is a noise, distance between edge points p3 and p4 is large and p4 is detected as a noise. A similar phenomenon may occur in the second example of the noise elimination processing.

With the third example of the noise elimination processing, whether or not the focused edge point is a noise can be determined irrespective of the positional relation to an edge point on the adjoining line. Therefore, the focused edge point can be prevented from being incorrectly determined as a noise because of the edge point p3 on the adjoining line being a noise.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
    an input unit for taking image data including a document region as input;
    a first candidate detector for detecting a first candidate of an edge point constituting a boundary line of said document region by scanning binarized image of said image data with a predetermined detection pattern along a line parallel to a prescribed direction of said image data;
    a second candidate detector for detecting a second candidate of an edge point based on differential value of pixels adjoining each other along said line; and
    an edge point determination unit for determining said second candidate as an edge point when said second candidate is positioned inside of said document region more than said first candidate, and otherwise determining said first candidate as an edge point.

2. The image processing apparatus according to claim 1, wherein said edge point determination unit determines said second candidate as an edge point when said second candidate is inside of said document region more than said first candidate and separation of said first candidate and said second candidate is not larger than a prescribed length, and otherwise determines said first candidate as an edge point.

3. The image processing apparatus according to claim 1, further comprising a noise determination unit for determining said edge point determined on said second line as a noise, when the distance between an edge point determined on a first line and an edge point determined on a second line adjoining said first line is larger than a prescribed length.

4. The image processing apparatus according to claim 1, further comprising a noise determination unit for determining the edge point determined on the second line as a noise, when a straight line passing through an edge point determined on a first line and an edge point determined on a second line adjoining the first line makes an angle larger than a prescribed angle with the direction perpendicular to the line.

5. The image processing apparatus according to claim 1, further comprising a noise determination unit for determining said one edge point as a noise, when the distance of one edge point from an approximate straight line approximating a boundary line of said document region determined on the basis of edge points determined on a plurality of lines is larger than a prescribed length.

6. The image processing apparatus according to claim 1, wherein said second candidate detector determines whether or not a focused pixel is to be detected as second candidate based on the sum of said differential values calculated for pixels included in a plurality of pixels that include the focused pixel and are continuous along said line.

7. The image processing apparatus according to claim 1, wherein a plurality of lines on which said first candidate detector and said second candidate detector detect edge points are arranged with an interval of one or more pixels, and
    wherein pixels for which said first candidate detector and said second candidate detector detect an edge points in each line are arranged continuously along the line.

8. An image processing method comprising:
    acquiring image data including a document region;
    detecting, using a computer, a first candidate of an edge point constituting a boundary line of said document region by scanning a binarized image of said image data with a predetermined detection pattern along a line parallel to a prescribed direction of image data;
    detecting a second candidate of an edge point based on differential value of pixels adjoining each other along said line; and
    determining said second candidate as the edge point when said second candidate is positioned inside of said document region more than said first candidate, and otherwise determining said first candidate as the edge point.

9. A computer-readable, non-transitory medium storing a computer program for image processing, wherein said computer program causes said computer to execute a process, said process comprising:
    acquiring image data including a document region;
    detecting a first candidate of an edge point constituting a boundary line of said document region by scanning a binarized image of said image data with a predetermined detection pattern along a line parallel to a prescribed direction of image data;
    detecting a second candidate of an edge point based on differential value of pixels adjoining each other along said line; and
    determining said second candidate as the edge point when said second candidate is positioned inside of said document region more than said first candidate, and otherwise determining said first candidate as the edge point.

10. An image processing system having an image reading device and a computer that receives via communication with the image reading device an image read by the image reading device, said system comprising:
    a first candidate detector for detecting first candidates of an edge point constituting a boundary line of a document region included in image data read by said image reading device by scanning binarized image of said image data with a predetermined detection pattern along a line parallel to a prescribed direction of said image data;
    a second candidate detector for detecting a second candidate of an edge point based on differential value of pixels adjoining each other along said line; and
    an edge point determination unit for determining said second candidate as an edge point when said second candidate is positioned inside of said document region more than said first candidate, and otherwise determines said first candidate as an edge point.

* * * * *